United States Patent
Van Wageningen et al.

(10) Patent No.: US 10,103,577 B2
(45) Date of Patent: Oct. 16, 2018

(54) WIRELESS INDUCTIVE POWER TRANSFER

(71) Applicant: KONINKLIJKE PHILIPS N.V., Eindhoven (NL)

(72) Inventors: Andries Van Wageningen, Wijlre (NL); Antonius Adriaan Maria Staring, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 27 days.

(21) Appl. No.: 15/125,588

(22) PCT Filed: Mar. 20, 2015

(86) PCT No.: PCT/EP2015/055864
§ 371 (c)(1),
(2) Date: Sep. 13, 2016

(87) PCT Pub. No.: WO2015/150107
PCT Pub. Date: Oct. 8, 2015

(65) Prior Publication Data
US 2017/0170686 A1    Jun. 15, 2017

Related U.S. Application Data

(60) Provisional application No. 62/006,512, filed on Jun. 2, 2014, provisional application No. 61/977,180, filed on Apr. 9, 2014.

(30) Foreign Application Priority Data

Mar. 31, 2014  (EP) ..................... 14162599

(51) Int. Cl.
*H02J 50/10* (2016.01)
*H02J 50/80* (2016.01)
*H02J 7/02* (2016.01)

(52) U.S. Cl.
CPC .............. *H02J 50/10* (2016.02); *H02J 7/025* (2013.01); *H02J 50/80* (2016.02)

(58) Field of Classification Search
USPC .......................................................... 307/104
See application file for complete search history.

(56) References Cited

U.S. PATENT DOCUMENTS

| 2012/0056485 | A1 | 3/2012 | Haruyama | |
| 2013/0154387 | A1* | 6/2013 | Lee | H02J 17/00 307/104 |
| 2014/0125138 | A1* | 5/2014 | Chen | H02J 7/025 307/104 |

FOREIGN PATENT DOCUMENTS

| WO | 2013046104 A1 | 4/2013 |
| WO | 2014001983 A1 | 1/2014 |

OTHER PUBLICATIONS

Wireless Power Consortium, Found in http://www.wirelesspowerconsortium.com/index.html, Downloaded on Aug. 3, 2014, 2 Pages.

(Continued)

*Primary Examiner* — Rexford Barnie
*Assistant Examiner* — Xuan Ly

(57) ABSTRACT

A wireless power transfer system includes a power transmitter (101) arranged to provide a power transfer to a plurality of power receivers (105, 109) via a wireless inductive power signal. T power transmitter (101) comprises a receiver (203) for receiving data messages, load modulated on the wireless inductive power signal and a broadcast transmitter (205) broadcasting on a broadcast communication channel. The power receivers (105) comprise a transmitter (505) for load modulating data message on the power signal. The power transmitter (101) comprises a communication controller (207) which broadcasts first indications indicative of the wireless inductive power signal being (Continued)

available for load modulation in a time interval. A first power receiver comprises a broadcast receiver (507) receiving first indications from the power transmitter (101) and a transmission controller (509) aligning transmissions of data messages with received first indications. The invention may improve communication for scenarios where one power transmitter simultaneously supports a plurality power receivers.

16 Claims, 15 Drawing Sheets

(56) References Cited

OTHER PUBLICATIONS

Qi, System Description, Wireless Power Transfer, vol. I: Low Power, Part 1: Interface Definition, Version 1.0, Jul. 2010, 84 Pages.

\* cited by examiner

| | $b_0$ | $b_1$ | $b_2$ | $b_3$ | $b_4$ | $b_5$ | $b_6$ | $b_7$ | |
|---|---|---|---|---|---|---|---|---|---|
| | x | x | f | x | Identifier | | | | Received power |
| $B_0$ | | | | | | | | | |
| $B_1$ | | | | | | | | | |
| $B_2$ | | | | | | | | | |

FIG. 15

WIRELESS INDUCTIVE POWER TRANSFER

CROSS-REFERENCE TO PRIOR APPLICATION

This application is the U.S. National Phase application under 35 U.S.C. § 371 of International Application No. PCT/EP2015/055864, filed on Mar. 20, 2015, which claims the benefit of European Patent Application No. 14162599.6, filed on Mar. 31, 2014 and U.S. Provisional Application 61/977,180, filed on Apr. 9, 2014 and U.S. Provisional Application 62/006,512, filed on Jun. 2, 2014. The applications are hereby incorporated by reference herein.

FIELD OF THE INVENTION

The invention relates to inductive power transfer and in particular, but not exclusively, to an inductive power transfer system in accordance with the Qi wireless power transfer standard.

BACKGROUND OF THE INVENTION

The number and variety of portable and mobile devices in use have exploded in the last decade. For example, the use of mobile phones, tablets, media players etc. has become ubiquitous. Such devices are generally powered by internal batteries and the typical use scenario often requires recharging of batteries or direct wired powering of the device from an external power supply.

Most present day systems require a wiring and/or explicit electrical contacts to be powered from an external power supply. However, this tends to be impractical and requires the user to physically insert connectors or otherwise establish a physical electrical contact. It also tends to be inconvenient to the user by introducing lengths of wire. Typically, power requirements also differ significantly, and currently most devices are provided with their own dedicated power supply resulting in a typical user having a large number of different power supplies with each being dedicated to a specific device. Although, the use of internal batteries may avoid the need for a wired connection to a power supply during use, this only provides a partial solution as the batteries will need recharging (or replacing which is expensive). The use of batteries may also add substantially to the weight and potentially cost and size of the devices.

In order to provide a significantly improved user experience, it has been proposed to use a wireless power supply wherein power is inductively transferred from a transmitter coil in a power transmitter device to a receiver coil in the individual devices.

Power transmission via magnetic induction is a well-known concept, mostly applied in transformers, having a tight coupling between primary transmitter coil and a secondary receiver coil. By separating the primary transmitter coil and the secondary receiver coil between two devices, wireless power transfer between these becomes possible based on the principle of a loosely coupled transformer.

Such an arrangement allows a wireless power transfer to the device without requiring any wires or physical electrical connections to be made. Indeed, it may simply allow a device to be placed adjacent to or on top of the transmitter coil in order to be recharged or powered externally. For example, power transmitter devices may be arranged with a horizontal surface on which a device can simply be placed in order to be powered.

Furthermore, such wireless power transfer arrangements may advantageously be designed such that the power transmitter device can be used with a range of power receiver devices. In particular, a wireless power transfer standard known as the Qi standard has been defined and is currently being developed further. This standard allows power transmitter devices that meet the Qi standard to be used with power receiver devices that also meet the Qi standard without these having to be from the same manufacturer or having to be dedicated to each other. The Qi standard further includes some functionality for allowing the operation to be adapted to the specific power receiver device (e.g. dependent on the specific power drain).

The Qi standard is developed by the Wireless Power Consortium and more information can e.g. be found on their website: http://www.wirelesspowerconsortium.com/index.html, where in particular the defined Standards documents can be found.

The Qi wireless power standard describes that a power transmitter must be able to provide a guaranteed power to the power receiver. The specific power level needed depends on the design of the power receiver. In order to specify the guaranteed power, a set of test power receivers and load conditions are defined which describe the guaranteed power level for each of the conditions.

Qi originally defined a wireless power transfer for low power devices considered to be devices having a power drain of less than 5 W. Systems that fall within the scope of this standard use inductive coupling between two planar coils to transfer power from the power transmitter to the power receiver. The distance between the two coils is typically 5 mm. It is possible to extend that range to at least 40 mm.

The Qi standard defines a variety of technical requirements, parameters and operating procedures that a compatible device must meet.

Communication

The Qi standard supports communication from the power receiver to the power transmitter thereby enabling the power receiver to provide information that may allow the power transmitter to adapt to the specific power receiver. In the current standard, a unidirectional communication link from the power receiver to the power transmitter has been defined and the approach is based on a philosophy of the power receiver being the controlling element. To prepare and control the power transfer between the power transmitter and the power receiver, the power receiver specifically communicates information to the power transmitter.

The unidirectional communication is achieved by the power receiver performing load modulation wherein a loading applied to the secondary receiver coil by the power receiver is varied to provide a modulation of the power signal. The resulting changes in the electrical characteristics (e.g. variations in the current draw) can be detected and decoded (demodulated) by the power transmitter.

Thus, at the physical layer, the communication channel from power receiver to the power transmitter uses the power signal as a data carrier. The power receiver modulates a load which is detected by a change in the amplitude and/or phase of the transmitter coil current or voltage. The data is formatted in bytes and packets.

More information can be found in chapter 6 of part 1 of the Qi wireless power specification (version 1.0).

System Control

In order to control the wireless power transfer system, the Qi standard specifies a number of phases or modes that the system may be in at different times of the operation. More details can be found in chapter 5 of part 1 of the Qi wireless power specification (version 1.0).

The system may be in the following phases:

Selection Phase

This phase is the typical phase when the system is not used, i.e. when there is no coupling between a power transmitter and a power receiver (i.e. no power receiver is positioned close to the power transmitter).

In the selection phase, the power transmitter may be in a stand-by mode but will sense in order to detect a possible presence of an object. Similarly, the receiver will wait for the presence of a power signal.

Ping Phase:

If the transmitter detects the possible presence of an object, e.g. due to a capacitance change, the system proceeds to the ping phase in which the power transmitter (at least intermittently) provides a power signal. This power signal is detected by the power receiver which proceeds to send an initial package to the power transmitter. Specifically, if a power receiver is present on the interface of the power transmitter, the power receiver communicates an initial signal strength packet to the power transmitter. The signal strength packet provides an indication of the degree of coupling between the power transmitter coil and the power receiver coil. The signal strength packet is detected by the power transmitter.

Identification & Configuration Phase:

The power transmitter and power receiver then proceeds to the identification and configuration phase wherein the power receiver communicates at least an identifier and a required power. The information is communicated in multiple data packets by load modulation. The power transmitter maintains a constant power signal during the identification and configuration phase in order to allow the load modulation to be detected. Specifically, the power transmitter provides a power signal with constant amplitude, frequency and phase for this purpose (except from the change caused by load-modulation).

In preparation of the actual power transfer, the power receiver can apply the received signal to power up its electronics but it keeps its output load disconnected. The power receiver communicates packets to the power transmitter. These packets include mandatory messages, such as the identification and configuration packet, or may include some defined optional messages, such as an extended identification packet or power hold-off packet.

The power transmitter proceeds to configure the power signal in accordance with the information received from the power receiver.

Power Transfer Phase:

The system then proceeds to the power transfer phase in which the power transmitter provides the required power signal and the power receiver connects the output load to supply it with the received power.

During this phase, the power receiver monitors the output load conditions, and specifically it measures the control error between the actual value and the desired value of a certain operating point. It communicates these control errors in control error messages to the power transmitter with a minimum rate of e.g. every 250 msec. This provides an indication of the continued presence of the power receiver to the power transmitter. In addition, the control error messages are used to implement a closed loop power control where the power transmitter adapts the power signal to minimize the reported error. Specifically, if the actual value of the operating point equals the desired value, the power receiver communicates a control error with a value of zero resulting in no change in the power signal. In case the power receiver communicates a control error different from zero, the power transmitter will adjust the power signal accordingly.

Although the current Qi Specification provides efficient power transfer and an attractive user experience in many scenarios and applications, it would be desirable to further enhance the user experience and to improve performance and operation. Therefore, work is ongoing to further develop the Qi Specification. Such work includes introducing new features, such as for example increasing the possible power levels substantially, simultaneously supporting multiple power receivers by a single power transmitter etc.

As part of the further development of the Qi Specification, the communication supported by the Specification is being enhanced. Specifically, communication from the power transmitter to the power receiver is being introduced. The intention is to introduce a low data rate communication link from the power transmitter to the power receiver. The low bandwidth of the link allows facilitated implementation and introduction of new communication functionality with reduced impact on existing communication functionality. Thus, improved compatibility with existing approaches and equipment is achieved. Accordingly, the communication from the power transmitter to the power receiver is likely to be substantially restricted compared to the communication from the power receiver to the power transmitter.

In general, it is desirable to further develop the Qi Specification to provide enhanced functionality, flexibility and performance. However, such a development of the standard must be made very carefully and must for example seek to optimize backwards compatibility and be compatible with other developments, such as for example an asynchronous bidirectional communication.

Conventionally, power transfer systems such as Qi systems are based on a one to one relationship between power transmitters and power receivers with a single power transmitter providing power to one power receiver at a time. However, it would be desirable to allow one power transmitter to be able to simultaneously transfer power to a plurality of power receivers. However, a critical issue for such scenarios is that of how to enable suitable communication between one power transmitter and multiple power receivers without this resulting in conflicts and interference. For example, if two power receivers individually use load modulation to transmit data messages to the power transmitter, the simultaneous communication of data messages from more than one power receiver will result in collisions and interference that will typically result in loss of both data messages.

Specifically, in a scenario where multiple power receivers are positioned on a power transmitter with the power receivers being powered by a wireless inductive power signal generated by the power transmitter, the communication from power receivers to power transmitter via the coupled coils and using e.g. load modulation can lead to collisions of the communication between power receivers and power transmitter.

This problem obviously occurs if the power transmitter has a relative large transmitter coil on which multiple power receivers can be positioned resulting in these receivers sharing the same power transmitter coil for receiving power and for communicating to the power transmitter. However, it will also occur e.g. in scenarios where the power transmitter has multiple (smaller) transmitter coils driven in parallel such that each power receiver can be coupled more directly to one or more transmitter coils.

Furthermore, the power receivers can typically not adapt their transmissions to the behavior of any other power receivers, as these can often not be detected by the individual power receiver. For example, the receiver coils may be weakly coupled to the transmitter coil(s). In such scenarios, the coupling between coils of different power receivers will typically be very low. Therefore, the load modulation of the power signal by one power receiver can typically not be detected by another power receiver.

A possible solution would be to have the individual power receivers transmit in dedicated time slots of a Time Division Multiple Access (TDMA) time frame. However, such an approach tends to be complex and inflexible. Specifically, it requires the allocation of devices to the time-slots and a synchronization of the power receivers to the TDMA frame. Such allocation can become a time-consuming and cumbersome process. Also, as the communication desire from individual power receivers may vary substantially, such an inflexible approach will typically result in relatively inefficient use of the communication bandwidth.

Hence, an improved wireless power transfer would be advantageous and in particular, an approach allowing for increased flexibility, increased efficiency, facilitated implementation, increased backwards compatibility, reduced complexity, improved communication control, improved support for multiple power receivers and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided a wireless power transfer system including a power transmitter (101) arranged to provide a power transfer to a plurality of power receivers (105, 109) via a wireless inductive power signal generated by at least one transmit inductor (103) of the power transmitter (101); the power transmitter (101) comprising: a receiver (203) for receiving data messages, the data messages being load modulated on the wireless inductive power signal by at least one of the plurality of power receivers (105); a broadcast transmitter (205) for broadcasting on a broadcast communication channel; each of the plurality of power receivers (105) comprising: a transmitter (505) for transmitting data messages to the power transmitter (101) by load modulation of the wireless inductive power signal; wherein the power transmitter (101) comprises a communication controller (207) which is arranged to broadcast first indications on the broadcast communication channel, a first indication being indicative of the wireless inductive power signal being available in a time interval for communication of a data message from a power receiver of the plurality of power receivers by load modulation of the wireless inductive power signal; at least a first power receiver (105) of the plurality of power receivers (105, 109) comprises: a broadcast receiver (507) for receiving first indications from the power transmitter (101) on the broadcast communication channel; a transmission controller (509) arranged to align transmissions of data messages with received first indications by controlling a timing of transmissions of data messages to correspond to time intervals indicated by first indications.

The invention may provide improved performance and/or operation of a wireless power transfer system. In particular, improved support for a plurality of power receivers may be provided.

The approach may improve communication between power receivers and a power transmitter, and may in particular in many scenarios reduce the risk of communication errors, such as specifically the loss of data messages transmitted from power receivers by load modulation. The approach may specifically reduce the risk of conflicts or collisions between multiple power receivers simultaneously load modulating the wireless inductive power signal. A flexible yet reliable sharing of a communication channel formed by load modulation of the wireless inductive power signal can be achieved.

The invention may in many embodiments provide effective communication control for a scenario where a plurality of power receivers are supported by the same wireless inductive power signal and communicate by load modulation of the wireless inductive power signal. The communication control may be implemented with a relatively low complexity and may specifically allow effective control without requiring direct interaction between power receivers, or indeed without requiring individual power receivers to consider any other power receivers.

Reliable communication control may be achieved in many embodiments with the power transmitter using broadcast data to control power receivers. The power transmitter may broadcast first indications in response to detections of load modulation of the wireless inductive power signal. In particular, it may in many embodiments transmit first indications only when no load modulation is detected of the wireless inductive power signal. Load modulations may for example be detected in response to load variations of the wireless inductive power signal, and specifically whether such load variations meet characteristics associated with load modulation. Specifically, timings and changes of e.g. power, amplitude and/or phase of the measured load may be compared to a criterion. The criterion may define operating characteristics/variations that may correspond to a load modulation of the wireless inductive power signal. If the criterion is met, the power transmitter may consider load modulation to be detected. In some embodiments, load modulation may be determined by the power transmitter being able to decode valid data from load variations of the wireless inductive power signal.

The approach provides effective communication control by implementing the power transmitter as responsible for controlling when power receivers may load modulate the wireless inductive power signal. Specifically, the power transmitter may transmit first indications such that a power receiver will only initiate a new load modulation if the first indication indicate that the power transmitter considers the wireless inductive power signal to be available for initiation of a load modulation, and specifically if no load modulation is currently ongoing (or expected within a given time interval).

The power transmitter is in the approach thus the controlling entity which is responsible for detecting if the wireless inductive power signal is available for load modulation, and for controlling the power receivers to align their transmissions by load modulation to when the wireless inductive power signal may be available for use.

The first indications can be considered to indicate that the load modulation channel is unused, and accordingly can be referred to as an indication of an unused channel, i.e. as unused channel indications.

The wireless inductive power signal may correspond to a magnetic field generated by the at least one transmit inductor of the power transmitter and coupled to the power inductors of the plurality of power receivers. A load modulation of either of the plurality of power receivers will cause a load variation of the magnetic field, and the wireless inductive power signal, which can be detected by the power transmitter. However, the plurality of power receivers load modulate the same wireless inductive power signal/magnetic field and accordingly interference between load modulation occurs if more than one power receiver load modulates the wireless inductive power signal at any given time.

The approach may in many scenarios reduce the risk of such collisions/interference. Further, the risk of collusions/interference can be reduced without introducing the complexity and inflexibility of e.g. typical time division multiple access schemes.

The broadcast communication channel may be any communication channel that allows the first indications to be received by the plurality of power receivers. In many embodiments, the broadcast communication channel may be provided by a modulation of the wireless inductive power signal. The modulation may specifically be a frequency, phase and/or amplitude modulation.

The data messages may include one or more bits, and may in some embodiments simply comprise control data. For example, in many embodiments, a data message may only comprise the payload data with no headers, trailers, or other data.

A first indication may be represented by any information or signal that the plurality of power receivers can detect and use to control their load modulation, and specifically the timing of the load modulation.

In some embodiments, a first indication may simply be provided by a change of a single property of the wireless inductive power signal, such as a change of a frequency to a predetermined frequency, a phase step, or e.g. a small amplitude variation.

In accordance with an optional feature of the invention, the power transmitter further comprises a feedback controller arranged to transmit a received message confirmation in response to receiving a first data message received from the first power receiver.

This may allow a more efficient communication and an efficient communication control and scheduling.

The feedback controller may transmit the received message confirmation in response to detecting that a first data message has been received from the first power receiver meeting a criterion. The criterion may be an indication of successful reception of the first data message, such as a determination that a checksum matches the expected value etc.

The received message confirmation may for example be provided as an acknowledge message, which in some embodiments or scenarios may e.g. also confirm the acceptance of a request of the data message.

In accordance with an optional feature of the invention, the first power receiver comprises a retransmission controller arranged to retransmit the first data message if a received message confirmation is not received.

This may provide improved communication control where the power transmitter may control the communication from power receivers to reduce the risk of conflicts and interference between multiple power receivers communicating at the same time. The approach may allow automatic resolution of possible collisions while ensuring that the first data message will be successfully communicated to the power transmitter.

A received message confirmation may be considered to not be received if no received message confirmation is received within a time interval, such as e.g. within a predetermined time from the transmission of the first data message.

The time of the retransmission may be different for different power receivers, and may specifically be pseudo-random.

In accordance with an optional feature of the invention, the retransmission controller is arranged to align the retransmission of the first data message with a received first indication by controlling a timing of a retransmission of the first data message to correspond to time intervals indicated by the first indications.

This may allow improved operation in many scenarios.

In some embodiments, the retransmission controller may be arranged to control a timing of the retransmission of the data message to correspond to a time interval indicated by a first indication.

In accordance with an optional feature of the invention, the feedback controller is arranged to transmit a receive error indication in response to no data message being received within a time interval of a first indication.

This may provide improved communication control and/or improved performance.

In accordance with an optional feature of the invention, the power transmitter further comprises an identity controller for allocating a temporary identity to each of the plurality of power receivers, the temporary identity being different for different power receivers of the plurality of power receivers; each of the power receivers comprises a power message controller arranged to include an allocated temporary identity in power feedback messages transmitted to the power transmitter; and the power transmitter comprises a power estimator for determining a received power estimate for at least one power receiver of the plurality of power receivers using temporary identities of received power feedback messages.

This may provide improved performance in many embodiments, and may specifically provide improved operation when one power transmitter supports a plurality of power receivers. Thus, the received power estimate for at least one power receiver of the plurality of power receivers may be determined in response to power feedback messages which include temporary identities. The power estimator may specifically determine a received power estimate for a first power receiver based on received power feedback data comprised in power feedback messages that also comprise a temporary identity allocated to the first power receiver.

The power estimator is arranged to determine the received power estimate for at least one power receiver of the plurality of power receivers in response to temporary identities of received power feedback messages.

The power estimator uses the temporary identities of the received power feedback messages as part of the algorithm to determine the power estimate. Typically, the power estimate is not determined as a mathematical formula of values of properties represented by the temporary identity, but rather the power estimator is arranged to select whether to use data of a given power feedback message based on the temporary identity of that power feedback message. Specifically, the power estimator may be arranged to use the temporary identities of the power feedback messages to select power feedback data by determining which power receiver has transmitted the power feedback message using the temporary identity. The received power estimate for that power receiver is then updated using power feedback data from the power feedback message. Thus, the received power estimate for a first power receiver may be determined as a function of received power values determined from data of (only) one or more power feedback messages comprising a temporary identity allocated to the first power receiver.

According to an aspect of the invention there is provided a power transmitter for a wireless power transfer system including a plurality of power receivers arranged to receive power from the power transmitter via a wireless inductive power signal generated by at least one transmit inductor of the power transmitter; the power transmitter comprising: a receiver for receiving data messages load modulated on the wireless inductive power signal by at least one of the plurality of power receivers; a broadcast transmitter for broadcasting on a broadcast communication channel; and a communication controller arranged to broadcast first indications on the broadcast communication channel, a first indication being indicative of the wireless inductive power signal being available in a time interval for communication of a data message from a power receiver of the plurality of power receivers by load modulation of the wireless inductive power signal.

In accordance with an optional feature, the power transmitter is arranged to operate in different modes of operation in different time slots of a time frame; the power transmitter, when in a first mode of operation in a first time slot of the time frame, being arranged to transmit at least one first indication if no load modulation of the wireless inductive power signal is detected, and when in the second mode of operation in a second time slot of the time frame, being arranged to not transmit any first indications.

This may provide improved communication control where the power transmitter may control the communication from power receivers to reduce the risk of conflicts and interference between multiple power receivers communicating at the same time. The feature may allow such an approach while being compatible with and accommodating a power receiver that is not capable of controlling load modulation transmissions based on first indications.

The approach may in particular provide improved backwards compatibility and may support and be compatible with legacy equipment in many scenarios and systems.

In accordance with an optional feature, a second power receiver of the plurality of power receivers is arranged to transmit data messages independently of the first indications.

The approach may in particular provide improved backwards compatibility and may support and be compatible with legacy equipment in many scenarios and systems. In particular, it may reduce the risk of collisions between power receivers even if one power receiver is not capable of operating on the basis of first indications.

In accordance with an optional feature of the invention, the power transmitter is arranged to synchronize the time frame to a timing of transmissions of data messages received from a power receiver.

This may provide improved communication control and/or performance. In many embodiments, it may allow e.g. support of operating procedures, and specifically communication operations, of legacy equipment while maintaining a low risk of collisions from multiple power receivers.

The synchronizing may specifically synchronize the start and/or end of the second time slot to a predetermined or expected timing of transmissions of data messages from the second power receiver.

In accordance with an optional feature of the invention, the power transmitter is arranged to synchronize the time frame to a timing of transmissions of power control loop messages received from a power receiver.

The system may in particular support operation of a power control loop for the second power receiver without requiring the feedback control error data messages to be transmitted dependent on the first indications.

In accordance with an optional feature of the invention, the communication controller is arranged to avoid first indications being transmitted within a predetermined time interval of an end of the first time slot.

In some embodiments, the transmission controller is arranged to control the timing of transmissions of data messages to within a first time interval of receiving a first indication; the communication controller being arranged to avoid first indications being transmitted within a predetermined time interval of an end of the first time slot, the predetermined time interval exceeding the first time interval.

Thus, in some embodiments, the communication controller may be arranged to avoid first indications being transmitted within a predetermined time interval before an end of the first time slot.

In accordance with an optional feature of the invention, the power transmitter is arranged to not operate in the second mode of operation in response to receiving power receiver configuration data indicating that all power receivers of the plurality of power receivers are arranged to control the timing of transmissions of data messages to correspond to time intervals indicated by first indications.

This may provide improved performance and may in particular allow the system to perform an optimization of operation. Specifically, the communication control may be adapted to the specific capability of the currently supported power receivers.

In accordance with an optional feature of the invention, the communication controller is arranged to repeatedly transmit first indications.

This may provide improved performance in many embodiments.

In accordance with an optional feature of the invention, the communication controller is arranged to avoid transmission of first indications when a load modulation of the wireless inductive power signal is detected.

This may provide improved performance in many embodiments, and may in particular reduce the risk of collisions between simultaneous transmissions from a plurality of power receivers.

In accordance with an optional feature of the invention, the communication controller is arranged to transmit first indications by transmitting a predetermined data symbol pattern.

This may provide a particularly efficient and reliable communication of first indications. The approach may allow low complexity and facilitate compatibility between power receivers and power transmitters.

The predetermined data symbol pattern may be a unique pattern. Thus, in many embodiments, the pattern may be a pattern which uniquely identifies a first indication, and the pattern may be one not used for any other data transmitted by the power transmitter.

In some embodiments, the predetermined data pattern may be continuously transmitted to indicate a first indication being present, i.e. a predetermined pattern may be repeated to indicate that the channel is currently free to be used. In some embodiments, the data may be transmitted in short intervals, e.g. with a predetermined pattern indicating a time interval in which a power receiver may initiate transmissions.

In some embodiments, the data rate of data symbols of the predetermined pattern may be different from a data rate of at least one other data message that may be transmitted by the power transmitter, and indeed in some embodiments the data rate may be different than the data rate of all other messages that may be transmitted by the power transmitter. Thus, the symbol time for the first indications may be different from one, more or all other messages.

Specifically, in some embodiments the power transmitter may be arranged to transmit an acknowledge message, the acknowledge message being represented by a predetermined pattern. The predetermined pattern for the first indication may have a different data rate than the data rate of the predetermined pattern for the acknowledge message.

In accordance with an optional feature of the invention, the predetermined data symbol pattern is an alternating pattern of binary data symbols.

The predetermined pattern may specifically be a pattern of alternating 0 and 1s (" . . . 01010101 . . . ").

The approach may facilitate operation and/or increase reliability of communication.

According to an aspect of the invention there is provided a power receiver for a wireless power transfer system including a power transmitter arranged to provide a power transfer to a plurality of power receivers via a wireless inductive power signal generated by at least one transmit inductor of the power transmitter; the power receiver comprising: a transmitter for transmitting data messages to the power transmitter by load modulation of the wireless inductive power signal; a broadcast receiver for receiving first indications from the power transmitter on a broadcast communication channel, a first indication being indicative of the wireless inductive power signal being available for load modulation in a time interval; and a transmission controller arranged align transmissions of data messages with received first indications by controlling a timing of transmissions of data messages to correspond to time intervals indicated by first indications.

In accordance with an optional feature of the invention, the transmission controller is arranged to control initiation of transmissions of data messages to within a time interval of receiving a first indication.

This may provide advantageous communication control in many embodiments. The time interval may for example be a time interval ending a predetermined time from the beginning and/or start of the first indication. The time interval may start at the start, or e.g. at the end, of the first indication. In some embodiments, a duration from the end of the first indication to the end of the corresponding first indication may be no more than 100 msec, 50 msec, 20 msec, or even 10 msec.

In some embodiments, the transmission controller may be arranged to transmit at least one type of data messages only within a time interval of receiving a first indication.

The data messages that the first power receiver can transmit may be divided into a plurality of types of data messages. The transmission control based on the first indication may apply only to a subset of the types of data messages. For example, another type of messages may always be transmitted regardless of the first indications. In many embodiments, the data messages subject to the first indication based communication control includes all messages, i.e. there may only be one type of data message or the communication control may apply to all types of data messages.

In accordance with an optional feature of the invention, the transmission controller is arranged to initiate of transmission at least one type of data messages only when a first indication is being received.

This may provide advantageous communication control in many embodiments. The approach may specifically in many scenarios allow a more efficient communication control and/or may remove complexity and/or provide a more reliable communication control.

According to an aspect of the invention there is provided a method of operation for a wireless power transfer system including a power transmitter arranged to provide a power transfer to a plurality of power receivers via a wireless inductive power signal generated by at least one transmit inductor of the power transmitter; the method comprising: the power transmitter receiving data messages, the data messages being load modulated on the wireless inductive power signal by at least one of the plurality of power receivers; the power transmitter broadcasting on a broadcast communication channel; each of the plurality of power receivers transmitting data messages to the power transmitter by load modulation of the wireless inductive power signal; the power transmitter broadcasting first indications on the broadcast communication channel, an first indication being indicative of the wireless inductive power signal being available in a time interval for communication of a data message from a power receiver of the plurality of power receivers by load modulation of the wireless inductive power signal; at least a first power receiver of the plurality of power receivers receiving unused channel indications from the power transmitter on the broadcast communication channel; and the first power receiver (105) aligning transmissions of data messages with received first indications by controlling a timing of transmissions of data messages to correspond to time intervals indicated by first indications.

According to an aspect of the invention there is provided a method of operation for a power transmitter for a wireless power transfer system including a plurality of power receivers arranged to receive power from the power transmitter via a wireless inductive power signal generated by at least one transmit inductor of the power transmitter; the method comprising: receiving data messages load modulated on the wireless inductive power signal by at least one of the plurality of power receivers; broadcasting first indications on a broadcast communication channel, an first indication being indicative of the wireless inductive power signal being available in a time interval for communication of a data message from a power receiver of the plurality of power receivers by load modulation of the wireless inductive power signal.

According to an aspect of the invention there is provided a method of operation for a power receiver for a wireless power transfer system including a power transmitter arranged to provide a power transfer to a plurality of power receivers via a wireless inductive power signal generated by at least one transmit inductor of the power transmitter; the method comprising: transmitting data messages to the power transmitter by load modulation of the wireless inductive power signal; receiving unused channel indications from the power transmitter on a broadcast communication channel, an unused channel indication being indicative of the wireless inductive power signal being available for load modulation in a time interval; and aligning transmissions of data messages with received unused channel indications by controlling a timing of transmissions of data messages to correspond to time intervals indicated by first indications.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which

FIG. 15 illustrates an example of a power feedback message suitable for some embodiments of the invention.

DETAILED DESCRIPTION OF SOME EMBODIMENTS OF THE INVENTION

The following description focuses on embodiments of the invention applicable to a wireless power transfer system utilizing a power transfer approach such as known from the Qi specification. However, it will be appreciated that the invention is not limited to this application but may be applied to many other wireless power transfer systems.

Figure 1:
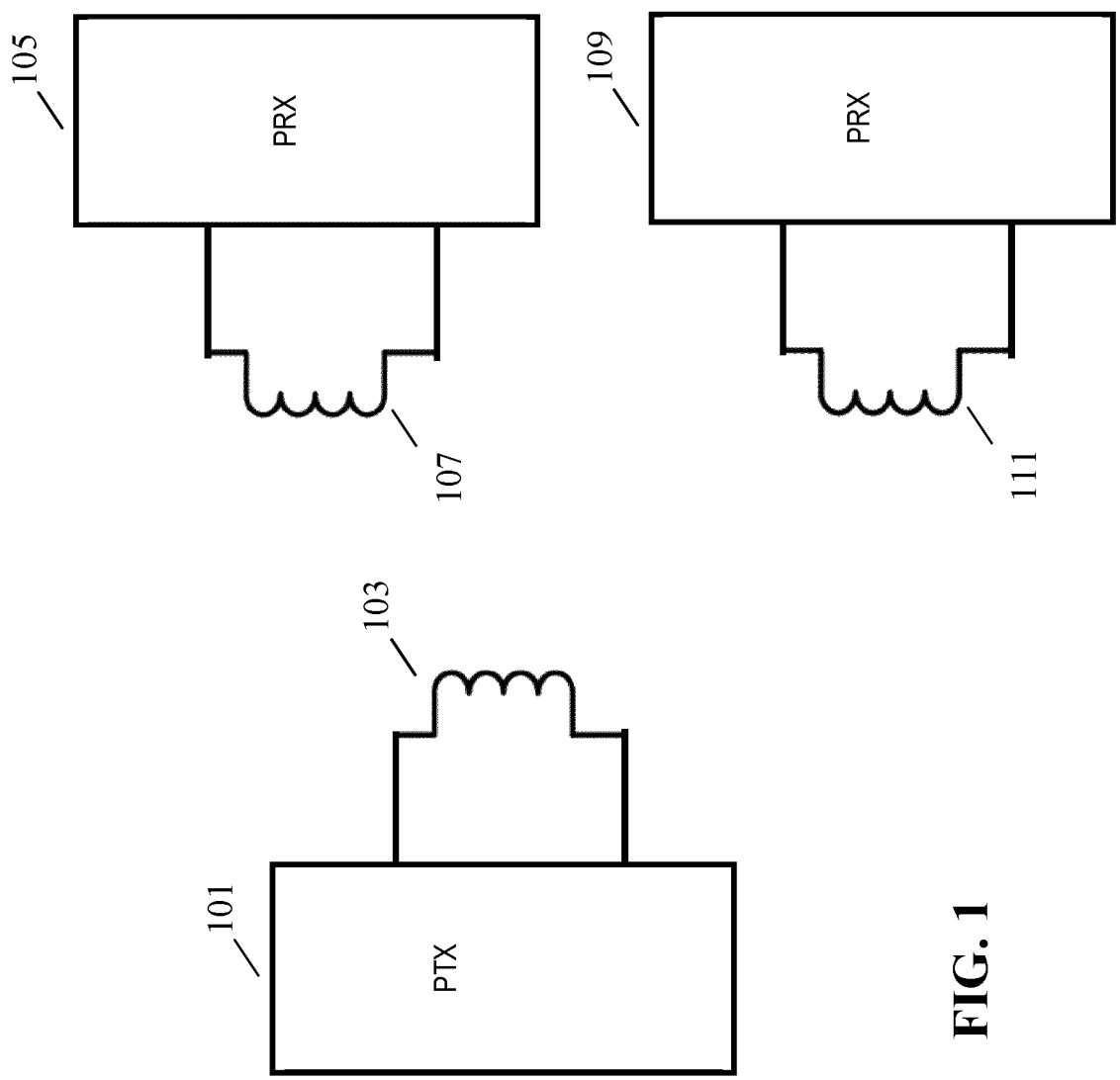
FIG. 1 illustrates an example of elements of a power transfer system in accordance with some embodiments of the invention.

FIG. 1 illustrates an example of a power transfer system in accordance with some embodiments of the invention. The power transfer system comprises a power transmitter 101 which includes (or is coupled to) a transmitter coil/inductor 103. The system further comprises a first power receiver 105 which includes (or is coupled to) a receiver coil/inductor 107. The power transfer system also comprises a second power receiver 109 which includes (or is coupled to) a second receiver coil/inductor 111.

The system provides a wireless inductive power transfer from the power transmitter 101 to the first and second power receivers 105. Specifically, the power transmitter 101 generates a wireless inductive power signal (also for brevity referred to as a power signal or an inductive power signal), which is propagated as a magnetic flux by the transmitter coil 103. The power signal may typically have a frequency between around 100 kHz to 200 kHz. The transmitter coil 103 and the receiver coils 107, 111 are loosely coupled and thus the receiver coils 107, 111 pick up (at least part of) the power signal from the power transmitter 101. Thus, the power is transferred from the power transmitter 101 to the power receivers 105, 107 via a wireless inductive coupling from the transmitter coil 103 to the receiver coils 107, 111.

The term power signal is mainly used to refer to the inductive signal/magnetic field between the transmitter coil 103 and the receiver coils 107, 111 (the magnetic flux signal), but it will be appreciated that by equivalence it may also be considered and used as a reference to an electrical signal provided to the transmitter coil 103 or picked up by a receiver coil 107, 111.

In the system of FIG. 1, the power transmitter 101 thus supports two power receivers 105, 109 simultaneously. A magnetic field is generated by the transmitter coil 103 and both the first and second receiver coils 107, 111 are within this magnetic field. Thus, the variations in the magnetic flux introduced by the transmitter coil 103 result in a current being induced in both the first and the second receiver coil 107, 111. Specifically, in the system of FIG. 1 both the first and the second receiver coil 107, 111 are loosely coupled to the transmitter coil 103.

In the following, the operation of the power transmitter 101 and the power receivers 105, 107 will be described with specific reference to an embodiment in accordance with the Qi standard (except for the herein described (or consequential) modifications and enhancements). In particular, the power transmitter 101 and the power receivers 105, 107 may substantially be compatible with the Qi Specification version 1.0 or 1.1 (except for the herein described (or consequential) modifications and enhancements).

To control the power transfer, the system may proceed via different phases, in particular a selection phase, a ping phase, identification and configuration phase, and a power transfer phase. More information can be found in chapter 5 of part 1 of the Qi wireless power specification.

For example, when setting up communication with the first power receiver 105, the power transmitter 101 may initially be in the selection phase wherein it merely monitors for the potential presence of a power receiver. The power transmitter 101 may use a variety of methods for this purpose, e.g. as described in the Qi wireless power specification. If such a potential presence is detected, the power transmitter 101 enters the ping phase wherein a power signal is temporarily generated. The first power receiver 105 can apply the received signal to power up its electronics. After receiving the power signal, the power receiver 105 communicates an initial packet to the power transmitter 101. Specifically, a signal strength packet indicating the degree of coupling between the power transmitter 101 and the first power receiver 105 is transmitted. More information can be found in chapter 6.3.1 of part 1 of the Qi wireless power specification. Thus, in the Ping phase it is determined whether a power receiver 105 is present at the interface of the power transmitter 101.

Upon receiving the signal strength message, the power transmitter 101 moves into the Identification & Configuration phase. In this phase, the power receiver 105 keeps its output load disconnected and communicates to the power transmitter 101 using load modulation. The power transmitter provides a power signal of constant amplitude, frequency and phase for this purpose (with the exception of the change caused by load-modulation). The messages are used by the power transmitter 101 to configure itself as requested by the power receiver 105.

Following the Identification and Configuration phase, the system moves on to the power transfer phase where the actual power transfer takes place. Specifically, after having communicated its power requirement, the power receiver 105 connects the output load and supplies it with the received power. The power receiver 105 monitors the output load and measures the control error between the actual value and the desired value of a certain operating point. It communicates such control errors to the power transmitter 101 at a minimum rate of e.g. every 250 ms to indicate these errors to the power transmitter 101 as well as the desire for a change, or no change, of the power signal.

Thus, in order to prepare and control the power transfer between the power transmitter 101 and the power receivers 105, 107 in the wireless power transfer system, power receivers 105, 107 communicate information to the power transmitter 101. Such communication has been standardized in the Qi Specification version 1.0 and 1.1. On the physical level, the communication channel from each of the power receivers 105, 107 to the power transmitter 101 is implemented by using the wireless inductive power signal as carrier. The power receivers 105, 107 transmit data messages by modulating the load of the respective receiver coil 107, 111. This results in corresponding variations in the power signal at the power transmitter side. The load modulation may be detected by a change in the amplitude and/or phase of the transmitter coil current, or alternatively or additional by a change in the voltage of the transmitter coil 103. Based on this principle, the power receivers 105, 107 can modulate data which the power transmitter 101 can then demodulate. This data is formatted in bytes and packets. More information can be found in the "System description, Wireless power Transfer, Volume I: Low Power, Part 1: Interface Definition, Version 1.0 July 2010, published by the Wireless power Consortium" available via http://www.wirelesspowerconsortium.com/downloads/wireless-power-specification-part-1.html, also called the Qi wireless power specification, in particular chapter 6: Communications Interface (or in subsequent versions of the Specification).

In the arrangement of FIG. 1, both power receivers 105, 107 can thus load modulate the wireless inductive power signal. The power transmitter 101 receives the transmitted data by measuring the load and detecting load changes, e.g. it may measure changes in the current of the transmitter coil 103. However, as such variations will be affected by both the load modulation of the first power receiver 105 and the load modulation of the second power receiver 109, the load modulations will interfere with each other. Therefore, if the power receivers 105, 107 simultaneously transmit a data message to the power transmitter 101, the load modulations will interfere with each other resulting in at least one of the data messages not being correctly received by the power transmitter 101. This may result in degraded operation. For example, if both power receivers 105, 107 are in the power transfer phases, collisions between the transmissions of the control error messages will result in degraded power control loop performance.

In the system of FIG. 1, a specific approach for controlling the communications from the power receivers 105, 107 is employed. Specifically, in the system, the power transmitter 101 controls when the transmissions from the power receivers 105, 107 occur. This is achieved by the power transmitter 101 broadcasting first indications that can be received by both of the power receivers 105, 107. At least one of the power receivers 105, 107 is arranged to control the transmission of data messages on the basis of the first indications. Thus, by broadcasting first indications, the power transmitter 101 can control when this power receiver load modulate the wireless inductive power signal. The power transmitter 101 may specifically transmit unused channel indications to indicate when there is no load modulation on the wireless inductive power signal, i.e. when the load modulation communication channel is unused. Accordingly, one or more of the power receivers 105, 107 will not load modulate the wireless inductive power signal when (the power transmitter 101 estimates that) the wireless inductive power signal is already modulated by the other power receiver.

The first indications are indicative of the wireless inductive power signal being available in a time interval for communication of a data message from a power receiver of the plurality of power receivers by load modulation of the wireless inductive power signal. Thus, the indications can provide an indication of the load modulation carrier in the form of the wireless inductive power signal being available for load modulation by a power receiver. Specifically, the first indications can indicate that the load modulation channel provided by the wireless inductive power signal is not used by any power receiver, and thus that it is an unused channel. The first indications can thus provide an indication of whether the channel is unused, i.e. the power transmitter 101 specifically transmits unused channel indications which are indicative of whether the channel is not used (unused) or whether it is used by a power receiver for load modulation.

In the following, the (first) indications transmitted by the power transmitter 101 will be referred to as unused channel indications. The unused channel indications provide an indication of whether the load modulation channel provided by the wireless inductive power signal is used by a power receiver or not. Thus, the unused channel indication provides an indication of whether the wireless inductive power signal is available for load modulation by a (new) power receiver.

Each of the first indications is associated with a time interval, and specifically each first indication can be indicative of a time interval in which the wireless inductive power signal is available for load modulation (specifically each indication can provide an indication of a time interval in which the channel is "free").

The first indications/unused channel indications thus indicate whether the wireless inductive power signal is available for communication in a time interval. This time interval may for example be given as a time interval relative to the indication, such as for a given start time to a given end time relative to the time of the broadcast of the indication (e.g. for a duration of, say, 20 msec from when the unused channel indication is broadcast). In many examples, the time interval may not be predetermined but may e.g. directly correspond to the unused channel indication being broadcast. Specifically, if the unused channel indication is broadcast, this indicates that the wireless inductive power signal is available and when the unused channel indication is not broadcast this indicates that the wireless inductive power signal is not available for load modulation by a (new) power receiver. Thus, the time interval may often correspond to the time interval in which the unused channel indication is broadcast. Further examples will be provided as part of the more detailed description.

The approach may very substantially reduce the risk of collisions and interference between simultaneous load modulation from data transmissions from the two power receivers 105, 107. Indeed, in many embodiments and scenarios, the risk of collisions may be reduced to an extent where the impact on the performance of the system may become substantially insignificant.

Thus, the approach described in the following will allow multiple power receivers to be simultaneously supported by the same power transmitter 101 and the same wireless inductive power signal while still allowing the multiple power receivers to communicate with the power transmitter 101. Furthermore, the approach is based on the power transmitter 101 controlling the transmissions of one or more of the power receivers 105, 109 and the approach does not require the power receivers 105, 109 to adapt their operation based on any direct detection, measurement or analysis of the presence of any other power receivers. Specifically, the individual power receiver does not need to detect any load modulation of the wireless inductive power signal by any other power receiver. In addition, a very flexible approach for controlling communication is achieved. The approach may specifically allow low complexity scheduling and communication resource management, and specifically may substantially reduce the risk of collisions.

For example, conventional multiple access schemes using e.g. Carrier Sensing Multiple Access with Collision Avoidance are based on the power receiver being able to detect transmissions of messages from other transmitters. However, such an approach is not suitable for load modulation wherein the power receivers cannot detect transmissions from other power receivers. However, in the current approach, no detection of transmissions from other power receivers is necessary. Indeed, the individual power receiver does not even need be aware of or consider whether any other power receivers are present, or indeed whether the power transmitter are supporting any other power receivers.

Figure 2:
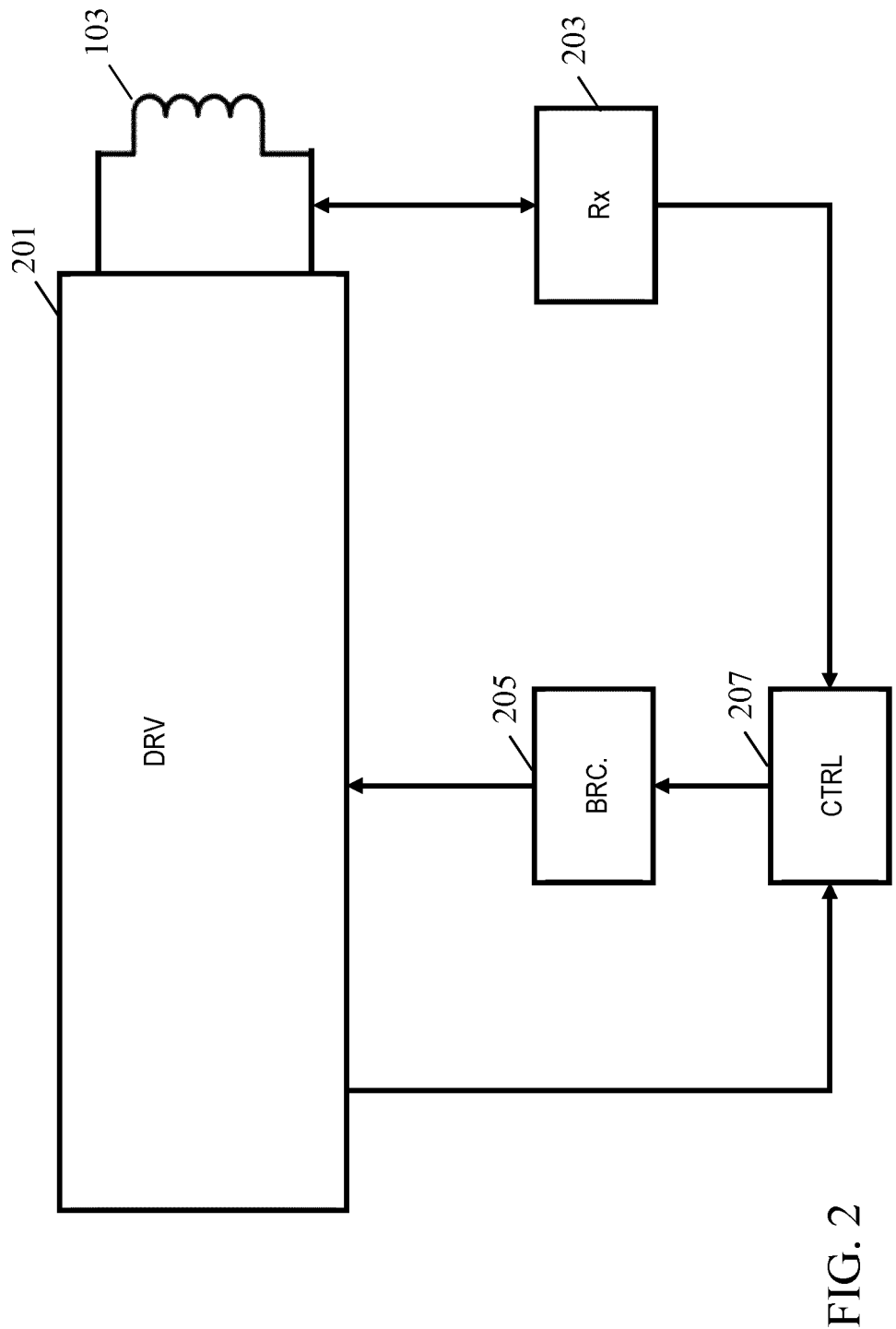
FIG. 2 illustrates an example of elements of a power transmitter in accordance with some embodiments of the invention.

FIG. 2 illustrates some exemplary elements of the power transmitter 101 of FIG. 1.

FIG. 2 illustrates a driver 201 which is coupled to the transmit coil 103 and which generates an electrical power signal and provides this to the transmit coil 103. Thus, the driver 201 provides the wireless inductive power signal to the power receiver 105 via the transmit coil 103 (and the receive coil 107).

Figure 3:
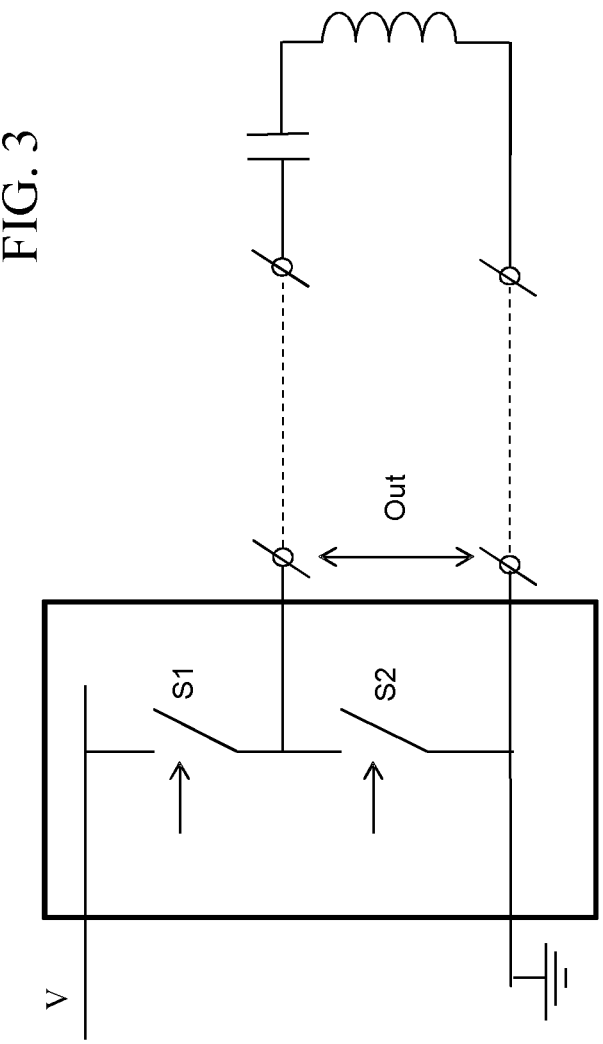
FIG. 3 illustrates an example of elements of a half-bridge inverter for a power transmitter in accordance with some embodiments of the invention.
Figure 4:
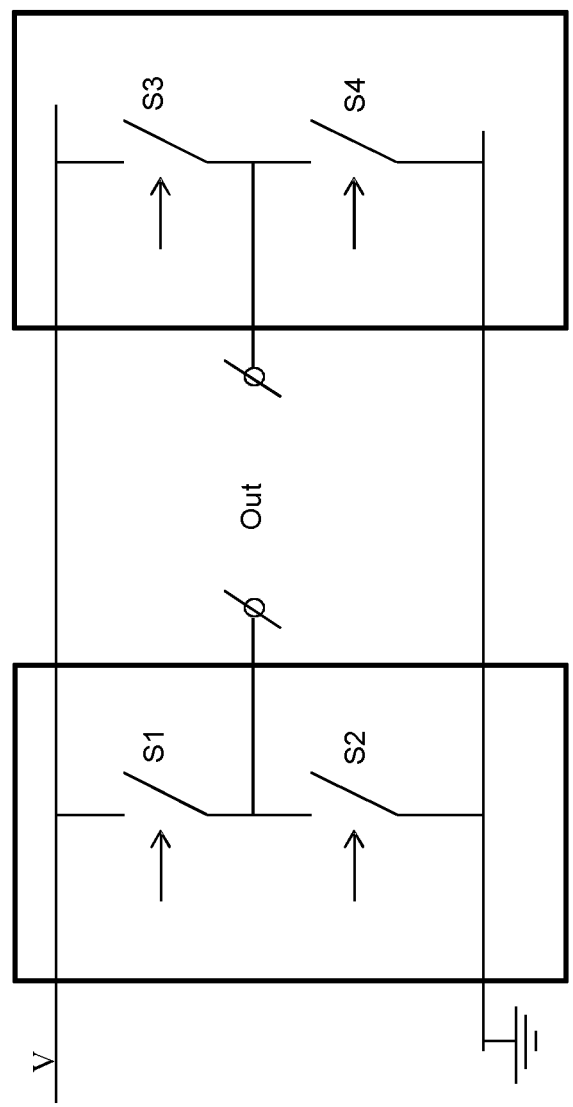
FIG. 4 illustrates an example of elements of a full-bridge inverter for a power transmitter in accordance with some embodiments of the invention.

The driver 201 generates the current and voltage which is fed to the transmitter coil 103. The driver 201 is typically a drive circuit in the form of an inverter which generates an alternating signal from a DC Voltage. FIG. 3 shows a half-bridge inverter. The switches S1 and S2 are controlled such that they are never closed at the same time. Alternatingly S1 is closed while S2 is open and S2 is closed while S1 is open. The switches are opened and closed with the desired frequency, thereby generating an alternating signal at the output. Typically the output of the inverter is connected to the transmitter coil via a resonance capacitor. FIG. 4 shows a full-bridge inverter. The switches S1 and S2 are controlled such that they are never closed at the same time. The switches S3 and S4 are controlled such that they are never closed at the same time. Alternatingly switches S1 and S4 are closed while S2 and S3 are open, and then S2 and S3 are closed while s1 and S4 or open, thereby creating a block-wave signal at the output. The switches are open and closed with the desired frequency.

The driver 201 also comprises control functionality for operating the power transfer function and may specifically comprise a controller arranged to operate the power transmitter 101 in accordance with the Qi standard. For example, the controller may be arranged to perform the Identification and Configuration phase as well as the power transfer phase of the Qi standard.

In the example, the power transmitter 101 comprises a single transmitter coil 103 which is driven by the driver 201. Thus, the wireless inductive power signal is generated by a single transmitter coil 103. However, it will be appreciated that in other embodiments, the wireless inductive power signal may be generated by a plurality of transmitter coils driven e.g. in parallel by the driver. Specifically, multiple transmitter coils driven by corresponding (dependent) output signals of the driver 201 may be used to generate the wireless inductive power signal. For example, two transmitter coils may be positioned at different positions to provide two charging points for two power receivers. The two coils may be fed the same output signal from the driver 201. This may allow an improved distribution of the wireless inductive power signal/magnetic field in order to support multiple charging points.

The power transmitter 101 further comprises a receiver 203 which is arranged to receive data messages from power receivers. Specifically, the receiver 203 is arranged to detect load modulation of the wireless inductive power signal and to decode such load modulation to determine the corresponding data. As indicated in FIG. 2, the receiver 203 may specifically be arranged to detect the load modulation by detecting e.g. variations of the current through the transmitter coil 103. It will be appreciated that in other embodiments, other approaches may be used, such as e.g. detecting the supply current variations to the inverter of the driver 201 etc.

The power transmitter 101 further comprises a broadcast transmitter 205 which is arranged to broadcast on a broadcast communication channel. Broadcasts may specifically be transmissions of data/indications/information which can be received by more than one power receiver. In the specific example, the broadcast transmitter 205 is arranged to modulate the wireless inductive power signal. Power receivers which are coupled to the wireless inductive power signal/transmitter coil 103 can demodulate this modulation of the wireless inductive power signal in order to extract the broadcast data/indications/information.

In the example, the broadcast transmitter 205 is specifically coupled to the driver 201 and is arranged to broadcast by modulating the wireless inductive power signal. Thus, the broadcast transmitter 205 can control when variations to the characteristics of the wireless inductive power signal are introduced to represent data being broadcast.

The power transmitter 101 comprises a communication controller 207 which is arranged to broadcast unused channel indications on the broadcast communication channel. The communication controller 207 broadcasts the unused channel indication by controlling the operation of the broadcast transmitter 205. The unused channel indications may be considered control data or information which is broadcast such that they can be received by power receivers receiving power from the power transmitter 101 (and having the required capability).

The unused channel indications may specifically be broadcast using the wireless inductive power signal. Thus, in the described system, unused channel indications are communicated by modulating the wireless inductive power signal. In some embodiments, each unused channel indication may be a data message comprising a plurality of data bits. In other embodiments, each unused channel indication may be a single bit simply indicating that the wireless inductive power signal is free to be used for load modulation within a given time interval. In yet other embodiments, an unused channel indication may be represented by a continuous change of a characteristic of the wireless inductive power signal. Thus, in some embodiments, an unused channel indication is continuously broadcast to indicate that a power receiver may initiate load modulation, i.e. when the unused channel indication modulation is present on the wireless inductive power signal, the load modulation channel is indicated to be available for use.

It will be appreciated that any suitable approach for modulating the wireless inductive power signal to provide unused channel indications may be used. For example, amplitude, frequency or phase modulation of the wireless inductive power signal may be used.

In the specific example of FIG. 2, the broadcast transmitter 205 is coupled to the driver 201 and is arranged to control the frequency of the drive signal to the transmitter coil 103, and thus of the wireless inductive power signal. The communication controller 207 is coupled to the broadcast transmitter 205 and is arranged to control the broadcast transmitter 205 to broadcast the unused channel indications by changing the frequency of the wireless inductive power signal. In the example, the unused channel indications are accordingly modulated onto the wireless inductive power signal by frequency modulation.

In the specific example, the unused channel indications are transmitted by changing the frequency of the wireless inductive power signal from one predetermined value to another. Specifically, when no unused channel indication is broadcast, the frequency of the wireless inductive power signal is at a first value (say 150 kHz). When an unused channel indication is broadcast, the frequency is changed to a second value (say 148 kHz). Thus, a very low complexity broadcast of unused channel indications can be achieved. The frequency difference may specifically be kept relatively low to avoid amplitude modulation resulting from the frequency variation (e.g. due to the coils being part of tuned circuits). For Qi compatible systems, the frequency difference may specifically be kept in the range from 0.3-3 kHz.

Figure 5:
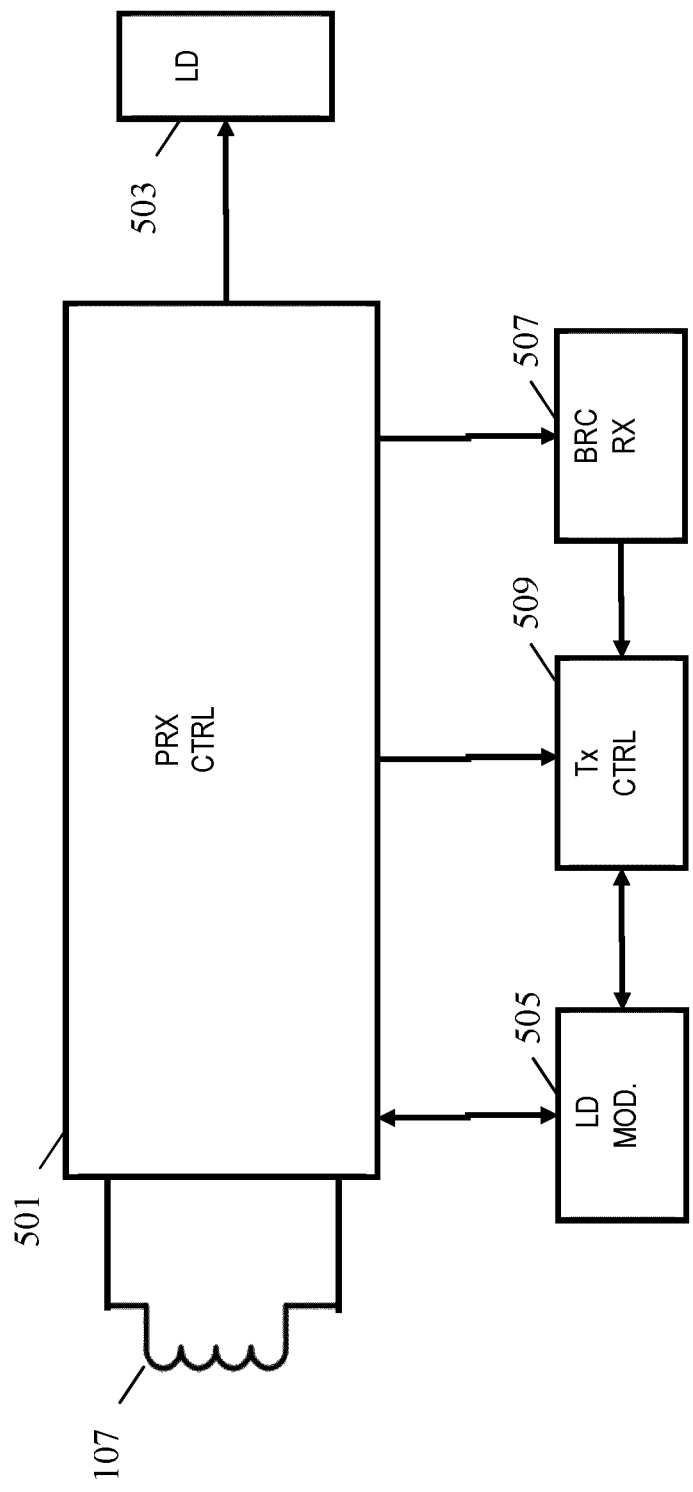
FIG. 5 illustrates an example of elements of a power receiver in accordance with some embodiments of the invention.

FIG. 5 illustrates some exemplary elements of the first power receiver 105.

The receiver coil 107 is coupled to a power receiver controller 501, which comprises various functionality for operating the first power receiver 105, and is in the specific example arranged to operate the first power receiver 105 in accordance with the Qi Specification. For example, the first power receiver 105 may be arranged to perform the Identification and Configuration phase and the power transfer phase of the Qi Specification.

The power receiver controller 501 is arranged to receive the wireless inductive power signal and to extract the power during the power transfer phase. The power receiver controller 501 is coupled to a power load 503 which is the load powered from the power transmitter 101 during the power transfer phase. The power load 503 may be an external power load but is often part of the power receiver device, such as a battery, display or other functionality of the power receiver (e.g. for a smart phone the power load may correspond to the combined functionality of the smart phone).

The first power receiver 105 comprises a load modulation transmitter 505 which is arranged to transmit data messages to the power transmitter 101 by load modulation of the wireless inductive power signal. The data messages may for example be configuration messages in the Identification and Configuration phase or power control error messages in the power transfer phase. The data messages may specifically comprise one or more bits and may e.g. be load modulated onto the wireless inductive power signal in accordance with the approach of the Qi Specification version 1.0 and 1.1.

The first power receiver 105 further comprises a broadcast receiver 507 which is arranged to receive unused channel indications from the power transmitter on the broadcast communication channel. In the specific example where the unused channel indications are communicated by modulation of the wireless inductive power signal, the broadcast receiver 507 is arranged to demodulate the wireless inductive power signal to retrieve the unused channel indication information.

In the specific example where an unused channel indication is broadcast by changing the frequency of the wireless inductive power signal from one predetermined value to another, the broadcast receiver 507 may simply detect the frequency of the wireless inductive power signal by detecting the frequency of the signal induced in the receive coil 107. This may for example be done by the broadcast receiver 507 comprising a filter and measuring the resulting amplitude.

The first power receiver 105 further comprises a transmission controller 509 which is coupled to the broadcast receiver 507 and the load modulation transmitter 505. The transmission controller 509 is arranged to align the transmissions of the data messages by the load modulation transmitter 505 to the unused channel indications received by the broadcast receiver 507. The transmission controller 509 specifically aligns transmissions of data messages with the received unused channel indications by controlling a timing of transmissions of data messages to correspond to time intervals indicated by the unused channel indications. Thus, the unused channel indication indicates time intervals wherein the wireless inductive power signal is unused for load modulation by any of the power receivers, and these indications are used to adapt when the power receiver transmits data messages by load modulation. The transmission controller 509 is specifically arranged to time the transmission of data messages such that they fall (or in many embodiments at least start) in the time intervals in which the unused channel indication indicates that the wireless inductive power signal is unused for load modulation. Thus, the transmission controller 509 may align transmissions of data messages with the received unused channel indications by controlling a timing of transmissions of data messages to correspond to time intervals indicated by the first indications.

Thus, rather than merely transmit data messages whenever the power receiver 105 may desire to do so, the transmission and load modulation by the load modulation transmitter 505 is controlled in dependence on the received unused channel indications.

For example, when the power receiver 105 has a data message to transmit to the power transmitter 101, the load modulation transmitter 505 may delay the load modulation of the wireless inductive power signal until the transmission controller 509 indicates that the transmission may begin. The transmission controller 509 will control the initialization of the transmission to only occur at a time when an unused channel indication is being, or has been, received which indicates that the load modulation communication channel is not in use, i.e. when it indicates that no other power receiver is known to be load modulating the wireless inductive power signal.

In this way, the transmissions of the data messages is by the transmission controller 509 time synchronized to timing indications provided by the unused channel indications. In some embodiments, the timing indications may be provided by the unused channel indications being multi-bit messages specifying time intervals in which new messages may be initiated.

However, in the specific example, the transmission of data messages from the first power receiver 105 are synchronized to the timing of the unused channel indications.

As an example, in some embodiments, the communication controller 207 may be arranged to continuously broadcast an unused channel indication whenever it is detected that there is no load modulation of the wireless inductive power signal by any power receiver. However, if any load modulation of the wireless inductive power signal is detected, the communication controller 207 may immediately stop the broadcasting of the unused channel indication.

As a specific example, if there is no load modulation detected, the frequency of the wireless inductive power signal may be changed to a value corresponding to the presence/broadcast of an unused channel indication. If any load modulation of the wireless inductive power signal is detected, the frequency is immediately changed back to the nominal value corresponding to no unused channel indication being broadcast. Thus, the presence or not of an unused channel indication in this case directly indicates whether the load modulation channel is considered in use or unused/free. As another example, the frequency may alternate between frequencies in a predetermined pattern. Specifically, the frequency may be continuously modulated and the modulation pattern may indicate when an unused channel indication is present. As an example, the frequency may be kept constant if the channel is in use (i.e. when no unused channel indication being broadcast). When an unused channel indication is transmitted, this can be done by frequency modulation by alternating the frequency between two closely spaced frequencies. The modulation of the unused channel indication onto the wireless inductive power signal can specifically consists of a fixed number of periods at the first frequency followed by another fixed number of periods at the second frequency.

In such an embodiment, the transmission controller 509 may be arranged to initiate transmission of a data message only when an unused channel indication is being received. Thus, if the transmission controller 509 receives information from the broadcast receiver 507 that the frequency of the wireless inductive power signal currently corresponds to an unused channel indication being received, it instructs the load modulation transmitter 505 that transmission of a data message may be initiated. If not, the transmission controller 509 instructs the load modulation transmitter 505 that no data messages may be transmitted. In this case, the load modulation transmitter 505 may for example buffer a pending data message and transmit it as soon as an unused channel indication is received.

In this way, a low complexity, yet reliable and efficient, communication control can be implemented which does not require the power receivers to directly detect each other.

It will be appreciated that in many embodiments, all data messages may be subject to the alignment to received unused channel indications, and specifically that transmission of data messages may only be initiated when an unused channel indication is received. However, in some embodiments, the unused channel indication alignment may only be applied to some (or one) types of data messages whereas another type of data messages may e.g. be transmitted independently of the unused channel indications. For example, some data messages may be considered of such high priority that they are transmitted even if the wireless inductive power signal may be used for load modulation by another power receiver.

In many embodiments, the communication controller 207 is arranged to stop broadcasting the unused channel indication as soon as load modulation is detected. In this case, the unused channel indication will typically be removed before the power receiver has finished the transmission of the data message. Thus, typically, the transmission of the data message will be continued after the unused channel indication is removed.

In the specific example, the power transmitter 101 may accordingly sense when the communication channel (specifically the load modulation channel) is free, and it may broadcast an unused channel indication when it is detected that the channel is free.

The first power receiver 105 (and possibly the second power receiver 109) monitors whether the channel is free by monitoring whether the power transmitter 101 broadcasts an unused channel indication or not. If the first power receiver 105 starts to send data (after detecting an unused channel indication), the power transmitter 101 detects that the channel is no longer free and removes the unused channel indication. This will prevent other power receivers with corresponding capability from using the communication channel and cause a collision and interference.

In some embodiments, the power transmitter 101 may not be arranged to continuously transmit unused channel indications when the load modulation communication channel is free. Rather, in some embodiments, the communication controller 207 may be arranged to transmit unused channel indications of limited duration. For example, when the communication controller 207 detects that the wireless inductive power signal is not being load modulated, it may transmit an unused channel indication for a time interval of a predetermined duration, such as e.g. for 10 msec or 20 msec.

In the example, a single unused channel indication may indicate that the wireless inductive power signal is free to be load modulated within a given time interval relative to the unused channel indication. For example, the unused channel indication may be considered to indicate that a power receiver seeking to transmit a data message may initialize the communication of this data message within a given time interval from when the transmission of the unused channel indication starts until a given time after the transmission of the unused channel indication ends, such as e.g. from the broadcasting of the unused channel indication starts until a maximum of 30 msec from the termination of the unused channel indication.

Thus, in such embodiments the transmission controller 509 will be arranged to align transmissions of the data message to (at least for one type of data) to control the timing of initiation of transmission data messages to within a time interval of receiving an unused channel indication. Specifically, the transmission controller 509 may be arranged to transmit at least one type of data message only within a given time interval of receiving an unused channel broadcast message.

In such an embodiment, the communication controller 207 may detect whether any load modulation occurs during the time interval, and if none is detected, it may transmit another unused channel indication. Thus, the communication controller 207 may be arranged to repeatedly transmit unused channel indications, for example periodically. The repetition of unused channel indications may be stopped when load modulation is detected at the power transmitter 101.

In such an exemplary embodiment, the power transmitter 101 may sense when the (load modulation) communication channel is free and indicates this to power receivers by broadcasting a short unused channel indication. In case the power transmitter 101 does not sense any activity on the channel within a certain time $t_{idle}$ (e.g. 20 ms), it repeats the indication that the channel is free by broadcasting the next unused channel indication.

The first power receiver 105 (and possibly the second power receiver 109) monitors the broadcasts of the power transmitter 101 and may decide to transmit data after it has detected an unused channel indication. If a power receiver 105 has decided to send data, it may be required to start within $t_{start}$ (e.g. 10 ms) after it has received an unused channel indication (e.g. after this has finished). Otherwise, it may be required to withhold any transmission of data until it detects a new unused channel indication. $t_{start}$ is generally chosen to be smaller than $t_{idle}$.

In the example, the power transmitter 101 may be arranged to broadcast an unused channel indication within $t_{wait}$ after the completion of a data transfer from a power receiver, i.e. after load modulation has stopped.

Furthermore, in many embodiments, the power transmitter 101 may be arranged to apply a delay $t_{after}$ after a power control error message has been received from a power receiver before it broadcasts a new unused channel indication. This delay can be used to prevent the modulation of the unused channel indication on the wireless inductive power signal from affecting the adjustment of the power control loop. For example, if the unused channel indication is modulated onto the wireless inductive power signal by an amplitude variation, the change due to the modulation and the change in response to the received power control error data message received from the power receiver may interfere with each other. Thus, the delay $t_{after}$ may allow the modulation and power adjustment to be more isolated from each other.

The system thus implements communication control based on power receivers monitoring unused channel indications broadcast by the power transmitter 101 and with the power receivers determining when to transmit data based on these indications. The power receivers may specifically only attempt to transmit data after an unused channel indication is received indicating that the used communication channel is not currently used. In this way, the power receivers may effectively communicate using load modulation of the same wireless inductive power signal without having to specifically determine the operation of other power receivers.

The Applicant's approach thus provides a multiple access scheme, which is particularly directed to the sharing of the wireless inductive power signal between multiple power receivers that each may use the wireless inductive power signal for load modulation. Thus, the approach is directed to a sharing of the same load modulation carrier, namely the wireless inductive power signal. The system only needs one carrier, and indeed that carrier is the wireless inductive power signal itself. Furthermore, the solution provides an asymmetric approach wherein each individual power receiver is able to adapt the usage of the wireless inductive power signal for load modulation based on information received directly from the power transmitter (the unused channel indications). The individual power receiver thus needs only receive information from the power transmitter and needs not consider any transmissions being made from any of the other power receivers.

Indeed, the system can work efficiently without requiring the individual power receiver to even be aware of whether any other power receivers are present. Rather, each individual power receiver can independently interoperate with only the power transmitter (and without considering any other power receivers), yet the system still allows multiple power receivers to effectively share the single load modulation carrier in the form of the wireless inductive power signal. Thus, the system also provides improved backwards compatibility and does not require the introduction of a new communication technology to accommodate multiple power receivers.

In many embodiments, the system may comprise functionality for confirming that messages from the power receivers are correctly received by the power transmitter 101.

Figure 6:
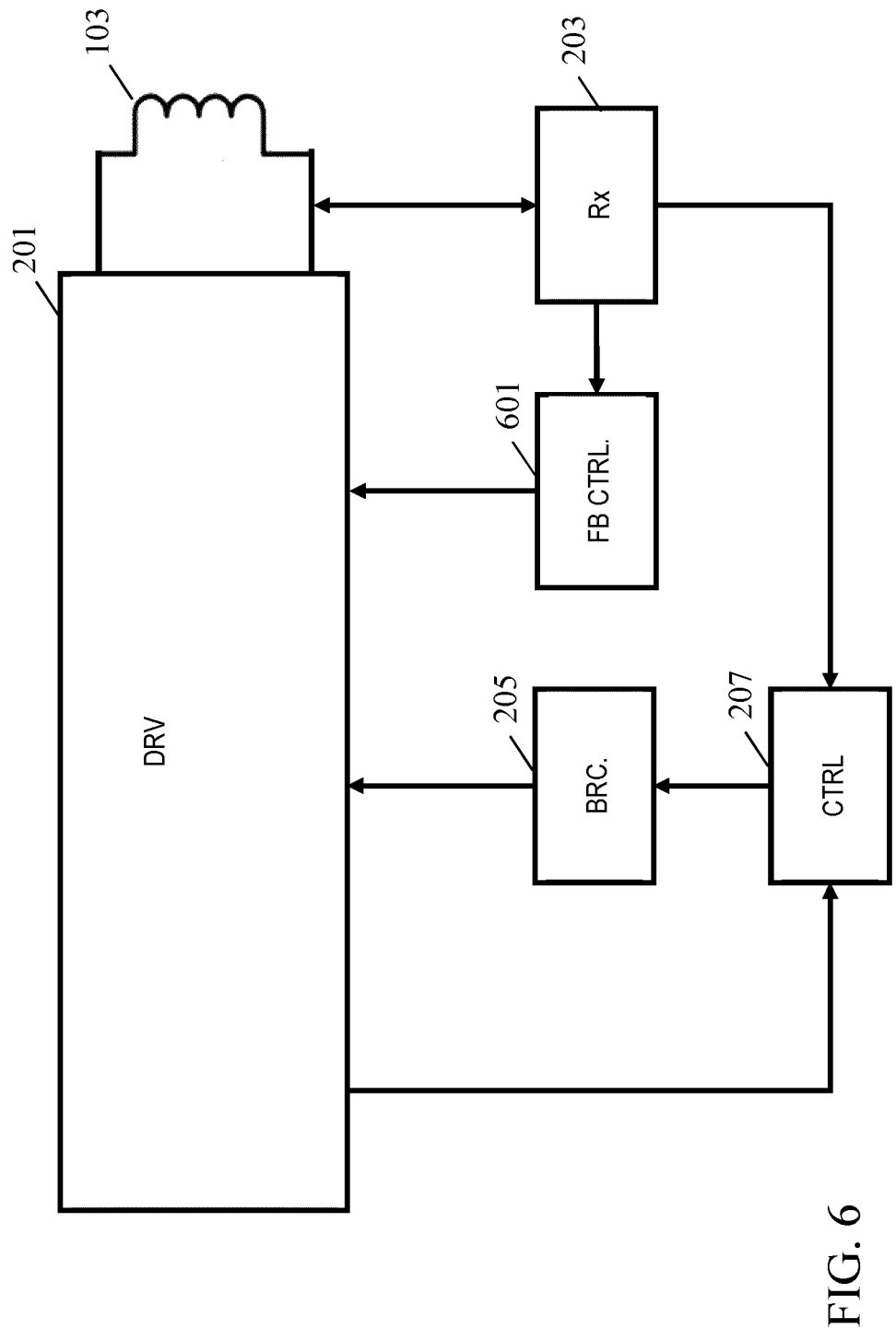
FIG. 6 illustrates an example of elements of a power transmitter in accordance with some embodiments of the invention.

FIG. 6 illustrates a power transmitter 101 corresponding to that of FIG. 2 but further comprising a feedback controller 601 which is arranged to transmit a received message confirmation in response to receiving a first data message from the first power receiver 105. Specifically, the feedback controller 601 may be arranged to broadcast received message confirmations to the power receivers, e.g. by modulating the wireless inductive power signal. The modulation of the wireless inductive power signal may for example use the same modulation approach as used for unused channel indications (e.g. both may be based on frequency modulation) with the power receivers being able to differentiate between these e.g. based on a timing of them, the data they contain, or the characteristics of the modulation. In some embodiments, different modulation approaches may be used. For example, unused channel indications may be modulated by frequency modulation whereas received message confirmations are modulated by phase modulation.

The feedback controller 601 may specifically detect that a message is being received by the receiver 203. It may then proceed to evaluate a correct reception criterion. If the criterion is met, the received message is considered to be correctly received, and in response the feedback controller 601 proceeds to transmit the received message confirmation.

The specific criterion used may be different in different embodiments. For example, in some embodiments, a data message may be considered to be received simply if load modulation has been detected. In other embodiments, a data message may only be considered to be received if the demodulated data meets a requirement, such as for example that a correct check sum is detected, and/or that the data corresponds to a valid message.

If it is considered that a data message has been received, the received message confirmation is transmitted/broadcast. If not, no received message confirmation is transmitted/broadcast.

In some embodiments, the feedback controller 601 may further be arranged to transmit a receive error indication if it is determined that no (valid) data message has been received within a given time interval of an unused channel indication. For example, if no data message meeting the correct reception criterion is received within a given duration from the end of an unused channel indication, the feedback controller 601 may transmit an active message indicating that no valid data message has been received.

In some embodiments, the received message confirmation may comprise an indication of the power receiver from which the message has been received. This may allow the individual power receiver to check that the received message confirmation is indeed a confirmation of the data message transmitted by that power receiver. However, in many systems, the data message may not indicate an origin and accordingly the received message confirmation cannot indicate any source. Also, the identification of a specific power receiver may in many scenarios unacceptably increase the required bandwidth for transmitting received message confirmations.

Therefore, in many embodiments, the received message confirmation does not contain any source indication for the data message being confirmed. In this case, each power receiver may consider a received message confirmation to be for that power receiver if it has indeed previously (within a suitable time interval) transmitted a data message. For example, the power transmitter 101 may be arranged to transmit a received message confirmation within, say, 20 msec of the data message ending. A power receiver may accordingly consider any received message confirmation received within 20 msec of it finishing the transmission of the data message to be a confirmation of that data message.

Due to the introduced communication control, it is unlikely that the received message confirmation actually was confirmation of another data message transmitted by another power receiver. Furthermore, for most scenarios and communications for a power transfer system, the very low risk of such a situation occurring is acceptable. For example, for a power control loop, a rare loss of a control error message is unlikely to unacceptably degrade the operation of the power control loop.

Figure 7:
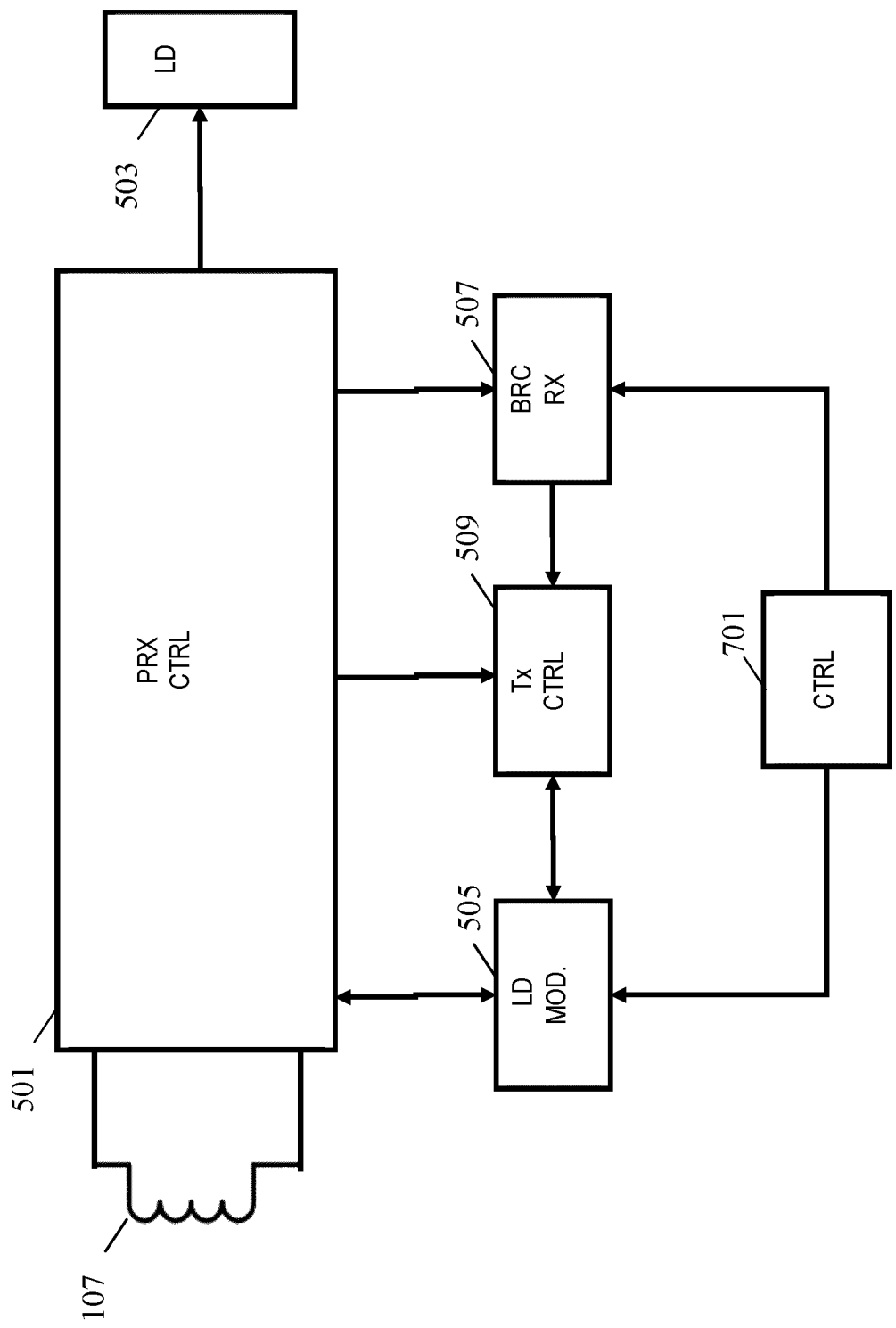
FIG. 7 illustrates an example of elements of a power receiver in accordance with some embodiments of the invention.

FIG. 7 illustrates a first power receiver 105 corresponding to that of FIG. 5 but further including a retransmission controller 701. The retransmission controller 701 is arranged to retransmit the data messages for which no received message confirmation are received.

Thus, if the first power receiver 105 transmits a data message and detects that a received message confirmation is broadcast by the power transmitter 101 within a given time interval, it determines that the data message was correctly received and proceeds accordingly.

However, if no received message confirmation is received, or if a receive error indication, is received, the retransmission controller 701 proceeds to retransmit the data message.

In many embodiments, the retransmission of the data message will be subject to the same restrictions and constraints as the first transmission of the data message. Specifically, the transmission controller 509 will be arranged to control the retransmission of the data message dependent on the unused channel indications. Specifically, the retransmission controller 701 is arranged to align the retransmission of the first data message with received unused channel indications. The alignment may use the same principles and approaches as for the first transmission, such as e.g. only transmitting when an unused channel indication is received, or within a given time interval of an unused channel indication being received.

The retransmission may occur at different times. Specifically, retransmissions for different power receivers may occur at different times. For example, each power receiver may have an associated retransmission delay which is different for different power receivers. If a collision occurs between two power receivers resulting in no data message being received by the power transmitter 101, no received message confirmation will be transmitted and accordingly both power receivers try to retransmit their data message. However, as the retransmissions will occur at different times, the collision of the retransmissions will be avoided.

In some embodiments, the timing of the retransmissions may have a random element. For example, when retransmitting, each power receiver may choose a delay randomly within a given range. The likelihood of both power receivers selecting the same delay value is very low, and thus the risk of a second collision is very low.

In some embodiments, retransmission delays may be determined and designated as time values. For example, in embodiments where a continuous unused channel indication is transmitted when no load modulation is detected, a retransmission delay may be determined as a certain amount of milliseconds.

In scenarios wherein repeated short unused channel indications are transmitted, the retransmission delay may be determined as a number of unused channel indications that must be received before the retransmission occur (in the associated time interval).

Thus, the retransmission may be subject to rules for when to retransmit. For example, the first power receiver 105 may choose to retransmit at the $n^{th}$ detection of an unused channel indication counting from the first power receiver's 105 last attempt to send data, or from a specific time point, such as the start of a time frame. The value n could for example be randomly chosen between 1 and x, where x is an invariant number, possibly configured by the power transmitter 101. As another example, n could be assigned by the power transmitter 101 to the first power receiver 105 such that it is different from any other power receiver supported by the power transmitter 101.

As another specific example, the first power receiver 105 may select a delay between $t_{waitmin}$ and $t_{waitmax}$ before it retransmits the data message. The delay can be random between a minimum and a maximum time, or could e.g. be individually assigned to each power receiver by the power transmitter 101.

The described approach may allow more reliable communication and may specifically provide an approach for resolving collisions that may occur despite the use of unused channel indications.

Indeed, in the system, collisions occur only when two power receivers try to start transmitting at the same time (i.e. before the unused channel indications can prevent the last power receiver from starting the transmission). However, this is a very substantial reduction from a system wherein collisions occur whenever desired transmission time intervals overlap.

Thus, a data message may potentially not be received due to a potential collision if more than one power receiver starts to transmit at the same time. However, in that case, the collision may be resolved by the described confirmation/feedback scheme.

In some embodiments, all of the power receivers may be arranged to coordinate their transmissions to the unused channel indications. Specifically, the second power receiver 109 may comprise the same functionality as described for the first power receiver 105. In such embodiments, the described approach may substantially reduce the risk of multiple power receivers load modulating the wireless inductive power signal at the same time.

Indeed, the only risk of a collision is if the power receivers independently and simultaneously decide to initialize the transmission of a data message when the unused channel indications indicate that the channel is free. In such a case, the confirmation approach may resolve the collision by retransmission (or the risk may simply be considered acceptable due to the low probability). The approach may typically allow very quick access to the communication channel for power receivers. Indeed, in power transfer systems such as Qi, the load modulation communication channel is unused for the majority of the time, and therefore the need for a power receiver to have to delay a transmission occurs relatively rarely. Furthermore, the approach may provide an equal access to the communication channel by all power receivers, i.e. all power receivers will experience the same support and have equal access to the communication channel.

In some embodiments, the system may be arranged to operate with power receivers having different capabilities. In particular, the system may provide backwards compatibility and specifically may allow a power receiver which is not capable of aligning transmissions to unused channel indications to be supported simultaneously with one or more power receivers that do align their transmissions to the unused channel indications.

In some embodiments, the power transmitter 101 may accordingly be arranged to operate in two modes. Furthermore, the power transmitter 101 may operate with a repeating time frame comprising a set of time slots, and with the power transmitter 101 operating in a first mode when in a first time slot and in a second mode when in a second time slot. In some embodiments, the time frame may only include two time slots, and thus the power transmitter 101 may alternate between operating in the first mode and operating in the second mode.

When the power transmitter 101 is operating in the first mode of operation, it is arranged to transmit one or more unused channel indications if no load modulation of the wireless inductive power signal is detected. Specifically, the power transmitter 101 may in this case operate as previously described, and may transmit unused channel indications that indicate to power receivers that they may proceed to initialize a data message transmission.

Thus, in the first time slot when the power transmitter 101 is operating in the first mode of operation, the first power receiver 105 may proceed to transmit data messages in response to the detection of an unused channel indication. Thus, the second power receiver 109 may operate as described previously.

When the power transmitter 101, however, is in the second mode of operation, it does not transmit any unused channel indications. Thus, in the second mode of operation, the power transmitter 101 does not transmit any unused channel indications and thus provides no indications to the power receivers that the communication channel is free and can be used, even if no load modulation is detected. Accordingly, power receivers that align their transmissions to unused channel indications will not initiate any transmissions.

Accordingly, when in the second mode of operation, the power transmitter 101 prevents unused channel indication compatible power receivers from accessing the load modulation communication channel. The power transmitter 101 thus creates a time slot wherein it is ensured that no unused channel indication compatible power receiver will transmit. Specifically, the first power receiver 105 will not initiate any transmissions during the second time slot.

In this way, the power transmitter 101 may effectively reserve the second time slot for transmissions from power receivers that are not aligning their communication with unused channel indications. For example, legacy power receivers that have no capability for considering unused channel indications when transmitting data can transmit within the second time slot without any risk of this transmission causing a conflict with transmissions from power receivers that align their transmissions to the unused channel indications. The power transmitter 101 may thus use the multi-mode approach to separate data message transmissions from different types of power receivers.

For example, in FIG. 1, the first power receiver 105 may be an unused channel indication compatible power receiver which is arranged to align transmissions to unused channel indications whereas the second power receiver 109 may be a legacy power receiver which has been manufactured without any knowledge or consideration of unused channel indications or of having to align transmissions thereto. The second power receiver 109 may instead simply transmit data messages when this is appropriate with respect to an earlier (e.g. Qi) specification. Thus, in the example, the first power receiver 105 transmits data messages in alignment with the unused channel indications whereas the second power receiver 109 is arranged to transmit data messages independently of the unused channel indications.

In the example, the power transmitter 101 is furthermore arranged to synchronize the time frame to a timing of transmissions of data messages from the second power receiver 109. Specifically, the power transmitter 101 may adjust the timing of the time frame such that the second time slot is aligned with time intervals in which a data message transmission from the second power receiver 109 is expected.

Indeed, in many embodiments, the timing of data messages from a power receiver can be estimated with a relatively high degree of reliability. For example, when the second power receiver 109 is operating in the power transfer phase, it is known that it typically will transmit control error data packets with an interval of around 200-250 msec. Accordingly, the power transmitter 101 may align the time frame such that the second time slot e.g. has a duration of 70 msec and starts 190 msec after the previous control error packet being received.

Thus, in some embodiments, the power transmitter 101 may specifically be arranged to synchronize the time frame to a timing of transmissions of power control loop/control error messages from the second power receiver 105. The synchronization to these messages typically provide a very efficient communication control. Indeed, it may allow very effective operation in the most prevalent phase of operation, namely the power transfer phase, and the synchronization may be particularly effective as these messages tend to have a high degree of periodicity and thus be very suitable for synchronization.

The system may accordingly support legacy power receivers and provide improved backwards compatibility yet still reduce the risk of collisions substantially. In practice, the approach may enable multiple power receivers to be supported simultaneously by the same power transmitter 101 while still allowing (typically) one power receiver to be a legacy power receiver.

Thus, if the system includes a power receiver that does not support the communication protocol based on unused channel indications (such as a power receiver that is implemented according to a version of the Qi specification that does not support unused channel indications), the power transmitter 101 can attempt to synchronize to the data messages that it receives from this particular device such that it broadcasts unused channel indications at times where no data is expected from this power receiver. Furthermore, the unused channel indications may be transmitted such that it is ensured that if a suitable power receiver initiates a transmission in response to an unused channel indication in the first time slot, then this transmission will be completed before the legacy power receiver will begin a transmission. For example, the power transmitter 101 may avoid broadcasting an unused channel indication a given time interval (e.g. 50 ms) before it expects data from the legacy power receiver.

Thus, in some embodiments, the communication controller may be arranged to avoid unused channel broadcast messages being transmitted within a predetermined time interval of an end of the first time slot.

In some embodiments, the system may thus be arranged to operate in different modes to specifically accommodate legacy equipment. The power transmitter 101 can specifically avoid interference with control error messages from a legacy power receiver by estimating the expected reception of these control error messages. It can accordingly inhibit the broadcasting of an unused channel indication at time interval $t_{before}$ before the expected potential start of a control error message from the legacy power receiver. The value of $t_{before}$ can be selected to be larger than the time needed for a first power receiver 105 to perform a data transfer. The minimal requirement for avoiding interference with legacy power receivers can e.g. be based on the expectation that the control error messages will be transmitted every 250 ms with a variation of ±25 ms.

In the case where the power transmitter 101 is arranged to transmit repeated (short) unused channel indications when in the first mode, the duration of the second time slot will exceed the repetition time, typically by a factor of two or more.

In some embodiments, the system may be arranged to determine the capability of the power receivers supported by the power transmitter 101. For example, during initialization of a power transfer, the power receivers may provide indications of their capability. This may include a power receiver transmitting a flag if it is capable of aligning the transmissions of data messages to unused channel indications.

In such a system, the power transmitter 101 may select whether to employ the second mode of operation dependent on the capability of the power receivers being supported. Thus, specifically, the power transmitter may be arranged to not operate in the second mode of operation if power receiver configuration data is received which indicates that all the supported power receivers are capable of controlling the timing of transmissions of data messages to unused channel indications.

Thus, in the specific example, the first power receiver 105 may transmit configuration data to the power transmitter 101 which indicates that it is capable of aligning transmissions to unused channel indications. If the second power receiver 109 is a legacy power receiver that is not capable of such alignment, this will not send configuration data indicating such a capability. Accordingly, the power transmitter 101 may proceed to operate with the time frame switching between the first and second modes as described previously.

However, if the second power receiver 109 is instead a power receiver that is indeed capable of aligning transmissions to unused channel indications, it will also send configuration data to the power transmitter 101 indicating this capability. If no other power receivers are currently supported by the power transmitter 101, the power transmitter 101 will have received configuration data indicating that all supported power receivers are capable of aligning transmissions to unused channel indications. In that case, the power transmitter 101 will proceed to only operate in the first mode, i.e. it will proceed to broadcast unused channel indications whenever it detects that the load modulation channel is unused. Thus, no time frame is imposed, and the power receivers may transmit at any time (when an unused channel indication is received).

Thus, the power transmitter 101 may dynamically adapt its operation to the specific operating scenario in which it finds itself.

In some embodiments, a power receiver capable of aligning transmissions to unused channel indications may also be capable of operating in another mode wherein transmissions are independent of unused channel indications. Specifically, the first power receiver 105 may be able to operate in an unused channel indication mode in which data messages are aligned to unused channel indications as described above. However, it may also operate in a backwards compatibility mode wherein it e.g. operates as a standard Qi Specification version 1.1 power receiver. Thus, the first power receiver 105 may also be able to operate as a conventional power receiver. This may allow it to be used with legacy power transmitters, such as e.g. Qi Specification version 1.1 power transmitters.

As a specific example of a possible operation, the first power receiver 105 may start up in the legacy mode and initially act as a version 1.1 power receiver by communicating the signal strength packet in the selection phase followed by communicating the identifier and configuration data in the identification & configuration phase. The first power receiver 105 may then set a bit in the configuration packet to indicate that it supports the unused channel indication communication control. As another example, the newest Specification version number with which the first power receiver 105 is compatible may be communicated as part of the configuration. This data may be used to (implicitly) convey support of the unused channel communication control method, e.g. v1.1 and below means that the first power receiver 105 does not support unused channel indication alignment, and v1.2 and above means that the first power receiver 105 does support unused channel indication alignment.

After the configuration phase, the first power receiver 105 may monitor the broadcast channel for unused channel indications from the power transmitter 101, and if any are detected it can switch to the unused channel indication mode. Otherwise, it remains in the legacy mode.

When the power transmitter 101 detects a signal strength packet from a power receiver, it can in the example prevent the broadcast of unused channel indications in order to prevent interference from other power receivers to the data messages expected from this new power receiver. After the reception of the configuration packet, the power transmitter 101 checks whether the new power receiver supports unused channel indication communication control or not. It then proceeds to select the appropriate configuration, such as specifically whether to operate as a conventional version 1.1 power transmitter, whether to operate only as an unused channel indication mode power transmitter, or whether to apply the time frame with time slots for different modes of operation.

FIGS. 8-11 illustrate some specific exemplary operating scenarios in which the power transmitter 101 operates in two modes in a time frame comprising two time slots, and where the power transmitter 101 is arranged to transmit repeated unused channel indications when in the first mode of operation. In the examples, the second power receiver 109 is a legacy power receiver whereas there are two power receivers corresponding to the described first power receiver 105, i.e. there are two power receivers that are capable of aligning their transmissions to the unused channel indications.

In the figures, the term PR1*a* refers to the one power receiver with capability as the first power receiver 105, PR1*b* refers to the other power receiver with capability as the first power receiver 105, PR2 refers to the second power receiver 109, PT refers to the power transmitter 101, UCI refers to unused channel indications, RMC refers to received message confirmations, and CE refers to power control error data messages.

Figure 8:
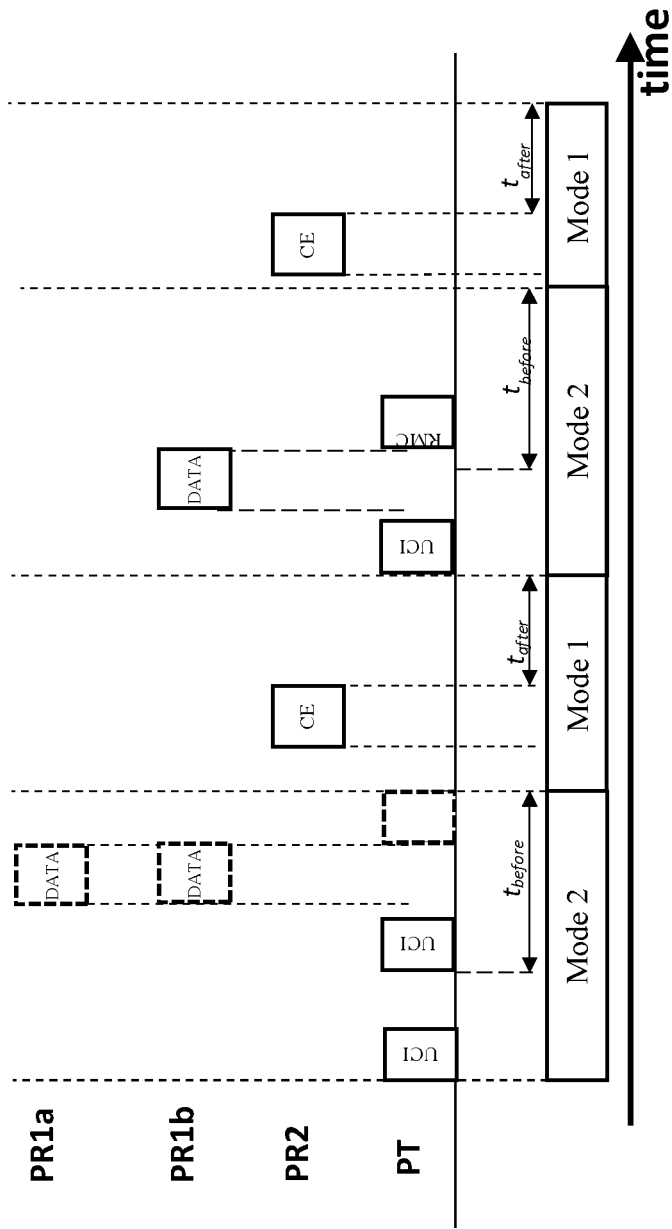
FIG. 8-11 illustrate examples of operations of a power transfer system in accordance with some embodiments of the invention.

FIG. 8 illustrates an example where the power transmitter 101 is first in the first mode where unused channel indications are transmitted to indicate that the load modulation channel is free. Both unused channel indication capable power receivers PR1*a* and PR1*b* have no data to send. The dashed blocks indicate the last opportunity for the unused channel indication compatible power receivers to send data, because the power transmitter 101 broadcasts the last unused channel indication a time interval $t_{before}$ before it proceeds to the second mode. Then the power transmitter 101 proceeds to the second mode in which the second power receiver 109 communicates a control error CE. The power transmitter 101 then waits for a duration of $t_{after}$ to complete the cycle before it proceeds to the first mode. In the meantime, one of the unused channel indication compatible power receivers PR1*b* has data to send, which it does directly after the power transmitter 101 has broadcast an unused channel indication. After the power transmitter 101 has acknowledged the correct reception of the data by transmitting a received message confirmation, there is insufficient time left for an additional transfer before the power transmitter 101 proceeds to the second mode and therefore no further unused channel indications are transmitted.

Figure 9:
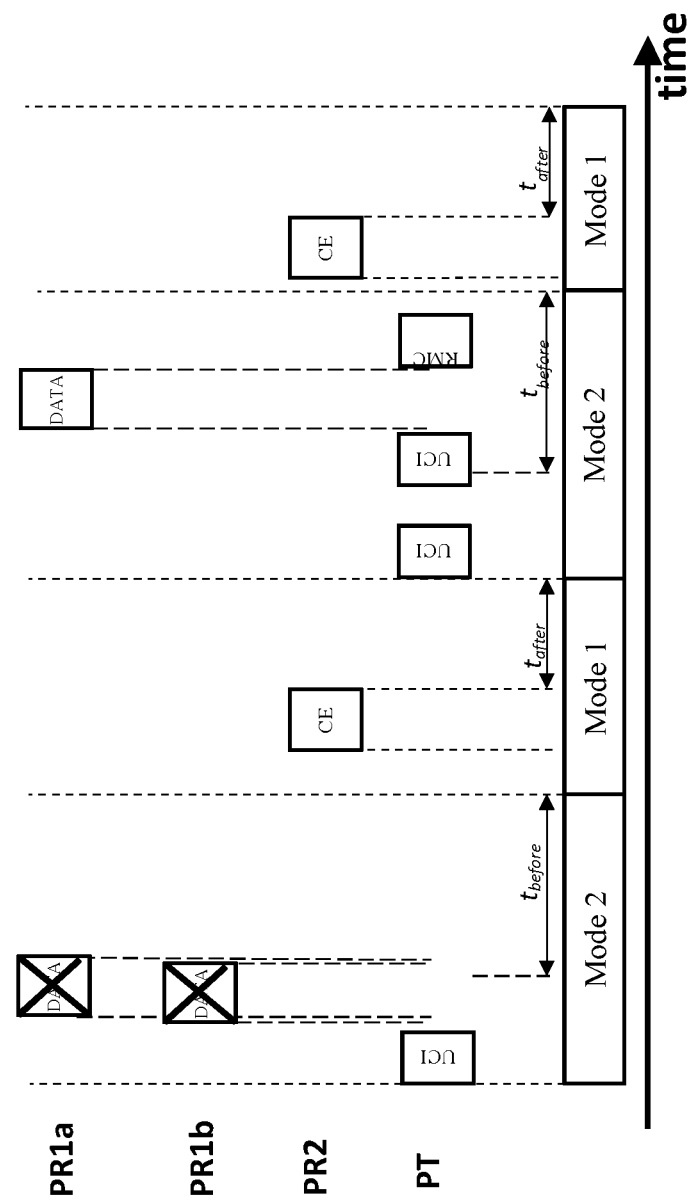

In the example of FIG. 9, the power transmitter 101 is initially in the first mode and transmits unused channel indications. Both unused channel indication compatible power receivers PR1*a* and PR1*b* have decided to initiate data transmission, and this results in a collision. The power transmitter 101 does not respond with a received message confirmation because it has not received the data correctly. As there is insufficient time left for a new unused channel indication, the power transmitter 101 proceeds to the second mode in which the second power receiver 109 communicates a control error message CE. The power transmitter 101 waits for a duration of $t_{after}$ to complete the cycle before it proceeds to the first mode. One of the unused channel indication compatible power receivers PR1*b* has decided to wait for e.g. four unused channel indications before retransmitting whereas the other PR1*a* has decided to wait for e.g. two unused channel indications before retransmitting. The power transmitter 101 proceeds to the first mode in the next cycle in which PR1*a* sends data on the second unused channel indication.

Figure 10:
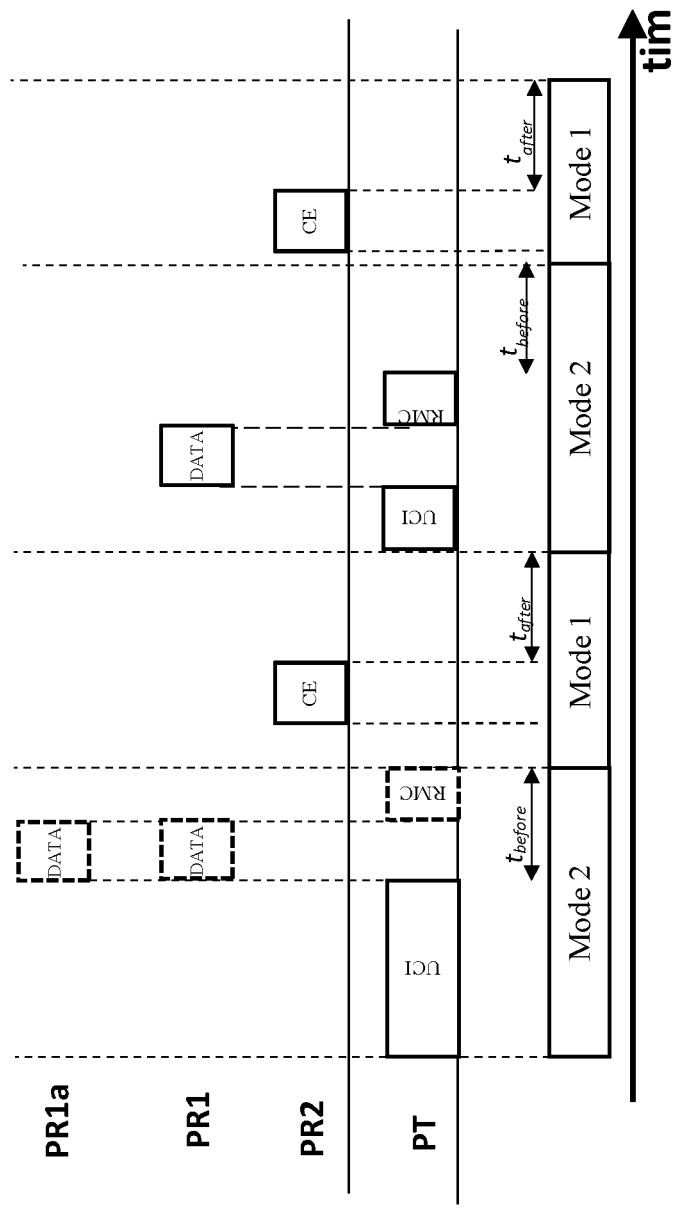

In the example of FIG. 10, a continuous unused channel indication is transmitted in the first mode rather than short repeated unused channel indications. In the example, the power transmitter 101 is initially in the first mode and initially broadcasts an unused channel indication. None of the unused channel indication compatible power receivers have any data to send. The dashed blocks indicate the last opportunity for the first power receiver 105 to initiate a data message since the power transmitter 101 stops to broadcast the unused channel indication at a time $t_{before}$, it proceeds to the second mode. Then the power transmitter 101 proceeds to the second mode in which the second power receiver 109 communicates a control error message CE. The power transmitter 101 waits for a duration of $t_{after}$ to complete the cycle before it proceeds to the first mode. In the meantime, one of the unused channel indication compatible power receivers PR1*b* has data to send, which it does directly after the power transmitter 101 broadcasts an unused channel indication. After the power transmitter 101 has acknowledged the correct reception of the data, there is insufficient time left for any additional transfer before the power transmitter 101 proceeds to the second mode and consequently no unused channel indication is broadcast.

Figure 11:
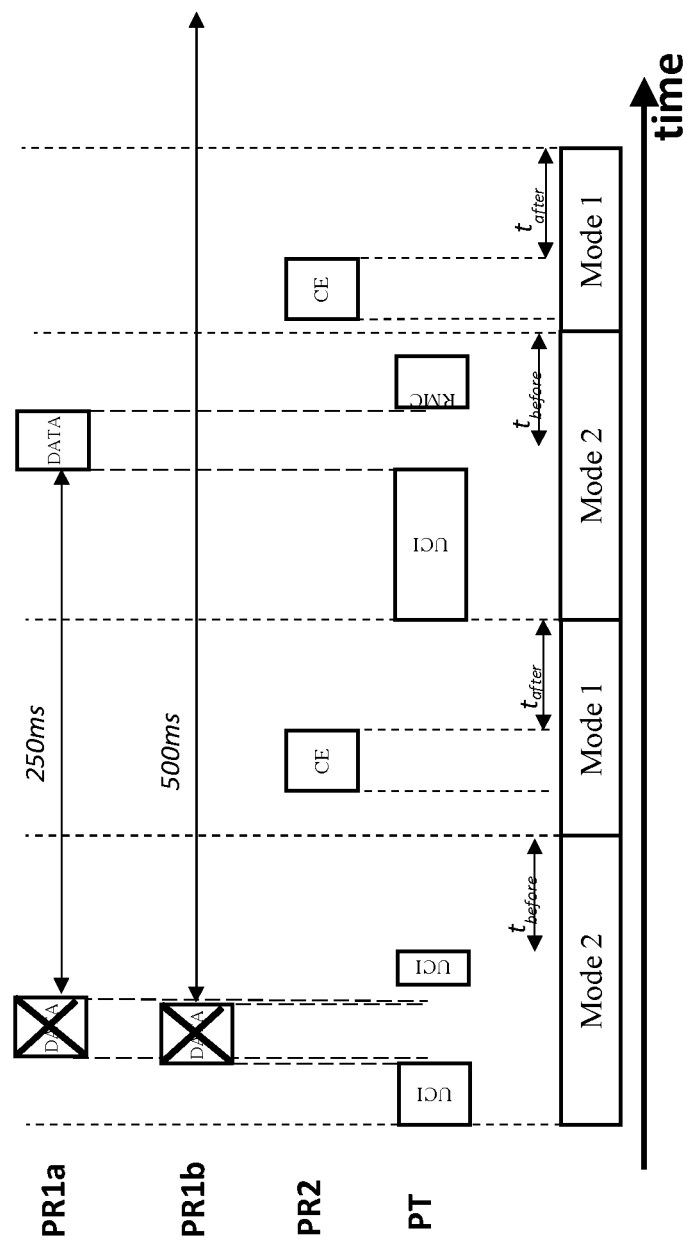

In the example of FIG. 11, a continuous unused channel indication is also transmitted when the load modulation channel is considered free. The power transmitter 101 is initially in the first mode and initially broadcasts an unused channel indication. Both unused channel indication compatible power receivers have decided to send data at the same time resulting in a collision. The power transmitter 101 does not respond with a received message confirmation. After the unused channel indication compatible power receivers have finished the load modulation, there is still some time left in the first time slot, and the power transmitter 101 broadcasts an unused channel indication to indicate that a transmission may be initialized. No transmissions are detected and the power transmitter 101 proceeds to the second mode in which the second power receiver 109 communicates a control error message CE. The power transmitter 101 waits for a time of $t_{after}$ to complete the cycle before it proceeds to the first mode. One of the unused channel indication compatible power receivers PR1*b* has decided to wait for e.g. 500 ms before retransmitting whereas the other PR1*a* has decided to wait for e.g. 200 ms before retransmitting. The power transmitter 101 proceeds to the first mode in the next cycle in which PR1*a* sends data in response to detecting an unused channel indication.

It will be appreciated that different approaches for communicating the unused channel indications may be used in different embodiments. For example, as mentioned previously, the power transmitter 101 may simply change the frequency of the wireless inductive power signal to indicate that an unused channel indication is being transmitted and that power receivers may initialize a communication by load modulation.

However, in many embodiments, an unused channel indication may be represented by a predetermined data symbol pattern modulated onto the wireless inductive power signal. For example, an unused channel indication may be indicated by a binary data pattern, i.e. by a pattern of 0s and 1s.

The individual data bits/symbols may be represented by an appropriate modulation of the wireless inductive power signal. For example, using frequency modulation, the frequency of the wireless inductive power signal may be set to one frequency value to indicate a "0" and to another frequency value to indicate a "1", i.e. each data or symbol value may be represented by a single frequency, with the frequency being different for each possible value of the data bit or symbol.

However, it will be appreciated that more complex modulation formats may be used and specifically that any suitable correlation between data values and modulation values may be used. For example, each possible data symbol value may be represented by a frequency pattern with the frequency patterns being different for the individual data values. Thus, a predetermined pattern of data bits will correspond directly to a predetermined pattern of frequencies (or frequency changes).

As a specific example, the modulation of the binary data bits may use e.g. Manchester (bi-phase) coding where a "1" is represented by a double change of the frequency and a "0" is represented by a single change of the frequency within a predefined period.

In many embodiments, an unused channel indication may be represented by an alternating pattern of 0s and 1s. Such a pattern may be particularly suitable for low complexity detection and may provide reliable communication.

The use of a predetermined pattern may allow a low complexity, yet reliable communication and detection of the unused channel indication. Furthermore, the approach may be consistent with communication of other data messages, and may provide improved compatibility.

For example, the power transmitter may be capable of transmitting acknowledge messages (ACK) and non-acknowledge messages (NACK) in reply to (at least some) received data messages from the power receivers. An ACK message may in some embodiments be used to merely indicate that a message has been correctly received and/or to indicate that the power transmitter agrees to a request (e.g.

for a specific operating parameter) transmitted from the power receiver. Likewise, the NACK message may in some embodiments indicate that a data message has not been correctly received or may additionally or alternatively be used to indicate a rejection of a request from the power receiver.

In such embodiments, the ACK and NACK messages may each be represented by a predetermined pattern, such as e.g.:
ACK "11111111"
NAK "00000000"

An unused channel indication may in such an embodiment e.g. be represented by a pattern of alternating bits:
UCI "01010101"

Thus, in the scenario where the power transmitter transmits individual and repeating unused channel indications, each of the unused channel indications may be represented by a predetermined pattern such as the above.

In embodiments where a continuous unused channel indication is transmitted whenever the channel is ready for communication, the predetermined pattern may be continuously repeated as long as the unused channel indication is transmitted. For example, the following data pattern may be transmitted continuously/repeatedly:
" . . . 010101010101 . . . "
until the power transmitter detects that a power receiver starts to communicate or that the wireless inductive power signal is not available for load modulation for another reason (such as being reserved for legacy equipment).

In some embodiments, unused channel indications may be communicated using a different data rate, for example an unused channel indication may be represented by a pattern with a double bit rate (half symbol time) compared to other messages.

Figure 12:
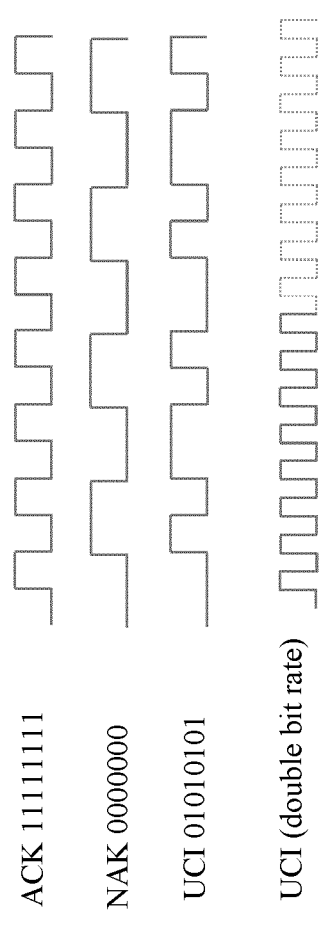
FIG. 12 illustrates an example of data symbol patterns for representing unused channel indications.

Examples of these patterns and communication approaches is provided in FIG. 12.

In some power transfer systems, it may be advantageous for the power transmitter 101 to be able to differentiate between different power receivers. In particular, in a scenario wherein a power transmitter supports a plurality of power receivers simultaneously, it may be desirable that the power transmitter can identify from which individual power receiver a given message can be received.

This may be particularly desirable in for example scenarios wherein power feedback messages can be received from a plurality of power receivers.

As an example, the presence of foreign objects, such as keys or other metal elements, that may unintentionally be positioned on a power transmitter may result in a significant power being induced in the object, resulting in not only a power loss, and thus reduced efficiency, but also in a potentially significant heating of the object. Accordingly, a power transmitter may include functionality for detecting such foreign objects.

The detection may often be based on a determination of unaccounted for power loss and a comparison of this to a threshold. The power loss can be calculated as the difference between the transmitted power from the power transmitter and the power received by the served power receivers. Indeed, power absorption in a foreign object can be detected by calculating the difference between the total transmitted and total received power by the power receiver(s). The power received by the power receiver(s) can be determined by the power transmitter based on received power feedback messages from the power receiver(s). In a system with multiple power receivers, the power transmitter has to calculate the sum of reported received power values to determine the total received power. In order to do so, the power transmitter must determine from which power receiver each of the received power feedback messages is received.

In some power transfer systems, such as the Qi system, each power receiver may have an associated identity. For example, for Qi, a power receiver identification message is defined which contains a 1 byte field indicating the Standard version with which the power receiver complies, a 2 byte field containing a manufacturer code, a 4 byte filed containing a basic identifier, and an 8 byte message containing an extended identifier. The power receiver communicates these messages in the packets during the Identification & Configuration phase. However, although such an identifier may identify a power receiver, it requires a lot of data bits to be communicated and accordingly will create a large overhead and inefficient communication if it were to be communicated frequently.

In the following, approaches will be described, which may allow a more efficient operation. Specifically, there may be provided a wireless power transfer system including a power transmitter 101 arranged to provide a power transfer to a plurality of power receivers 105, 109 via a wireless inductive power signal generated by at least one transmit inductor 103 of the power transmitter 101. The power transmitter 101 may comprise a receiver 203 for receiving data messages, the data messages being load modulated on the wireless inductive power signal by at least one of the plurality of power receivers 105. Each of the plurality of power receivers 105 may comprise a transmitter 505 for transmitting data messages to the power transmitter 101 by load modulation of the wireless inductive power signal.

In such an application, the power transmitter 101 may be arranged to control allocation of an identifier to each of the power receivers 105. The identifier allocated to each power receiver 105 may be a temporary identifier. The identifier is thus not a permanent identifier uniquely identifying the individual power receiver 105 but rather is a temporary identity which is only allocated for a (fixed or variable) time interval. The identifier is a reusable identifier which specifically may be reused by the power transmitter 101 for other power receivers 105 at other times or by other power transmitters for other power receivers (possibly simultaneously).

The temporary identity may specifically be valid only for a time interval which does not exceed the time interval of a power transfer operation. The temporary identity may be allocated for a maximum of one power transfer operation. In some scenarios, the temporary identity may only be allocated for a part of a power transfer operation. A power transfer operation may be initiated by the detection of a power receiver which is not served by the power transmitter 101 and may terminate when the power transfer is terminated (e.g. at the request of the power receiver)

The identifier may specifically be a non-unique identifier for the power receiver but the allocation by the power transmitter 101 may be such that each of the plurality of power receivers 105 served by the power receiver is allocated a different identifier at any given time, i.e. the identity for each power receiver is unique within the group of power receivers served by the power transmitter 101.

Since the identity need only be unique within a small group and due to it being dynamically allocated (and thus there is no need to pre-determine any identity information, such as e.g. a manufacturer code etc.), only a few unique identities are required at any given time. Accordingly, the number of bits required for the identity can be kept to a very low level. For example, if a maximum number of four power receivers can be served by the power transmitter 101 simultaneously, the number of bits required for the identity may be as low as two bits. The approach thus allows the overhead required for communicating the identity to be reduced to very low levels, thereby making it feasible and practical to communicate this frequently.

In the system, the power receiver is arranged to include the temporary identity in power feedback messages which provide an indication of the received power to the power transmitter 101. Specifically, the identity is included in the received power messages that are transmitted from the power receivers 105 to the power transmitter 101 and which provide an indication of an amount of power received by the power receiver 105. Thus, a short identifier may be added to every received power packet transmitted to the power transmitter 101 from the power receiver 105. The identifier may typically be coded in e.g. 3 to 6 bits.

The power transmitter may accordingly, when receiving power feedback messages, such as specifically received power messages, extract the identity and allocate the power information to the individual power receiver based on this information. It may then determine a received power estimate for each served power receiver by applying the power feedback message information to the appropriate receiver. Thus, the power transmitter 101 may determine a received power estimate for each power receiver 105 served by it, based on the identity comprised in the received power feedback messages.

The power transmitter may further determine a total/combined received power estimate for the power receivers served by the power transmitter 101. This may be compared to a locally generated transmitted power estimate. If the difference between the transmitted power estimate and the combined received power estimate exceeds a threshold, this may be considered to correspond to a detection of a foreign object. The power transmitter 101 may in response e.g. terminate the power transfer.

The approach may thus allow a very efficient power estimation and in particular foreign object detection in scenarios wherein a power transmitter serves multiple power receivers.

The approach of using temporary, power transmitter controller identity allocations may be particularly advantageous with the described approach of using unused channel indications to control when the individual power receivers transmit. This may provide a very efficient and reliable simultaneous support for multiple power receivers by the same power transmitter.

Thus, in many applications, the power transmitter and power receivers may be as previously described (in particular with reference to FIGS. 1-12) but further enhanced to allow use of the temporary, power transmitter controlled identity. However, it will be appreciated that in some applications, the temporary, power transmitter controlled identity may be used without the use of the unused channel indication approach.

The following description will focus on embodiments wherein the power transmitter and power receivers of FIGS. 1-7 are enhanced to include the use of a temporary, power transmitter controlled identity. However, it will be appreciated that in many applications the broadcast transmitter 205 for broadcasting on a broadcast communication channel; the communication controller 207 arranged to broadcast unused channel indications on the broadcast communication channel, an unused channel indication being indicative of the wireless inductive power signal being available for load modulation in a time interval; the a broadcast receiver 507 for receiving unused channel indications from the power transmitter 101 on the broadcast communication channel; and the transmission controller 509 arranged to align transmissions of data messages with received unused channel indications may be optional and need not be included.

Figure 13:
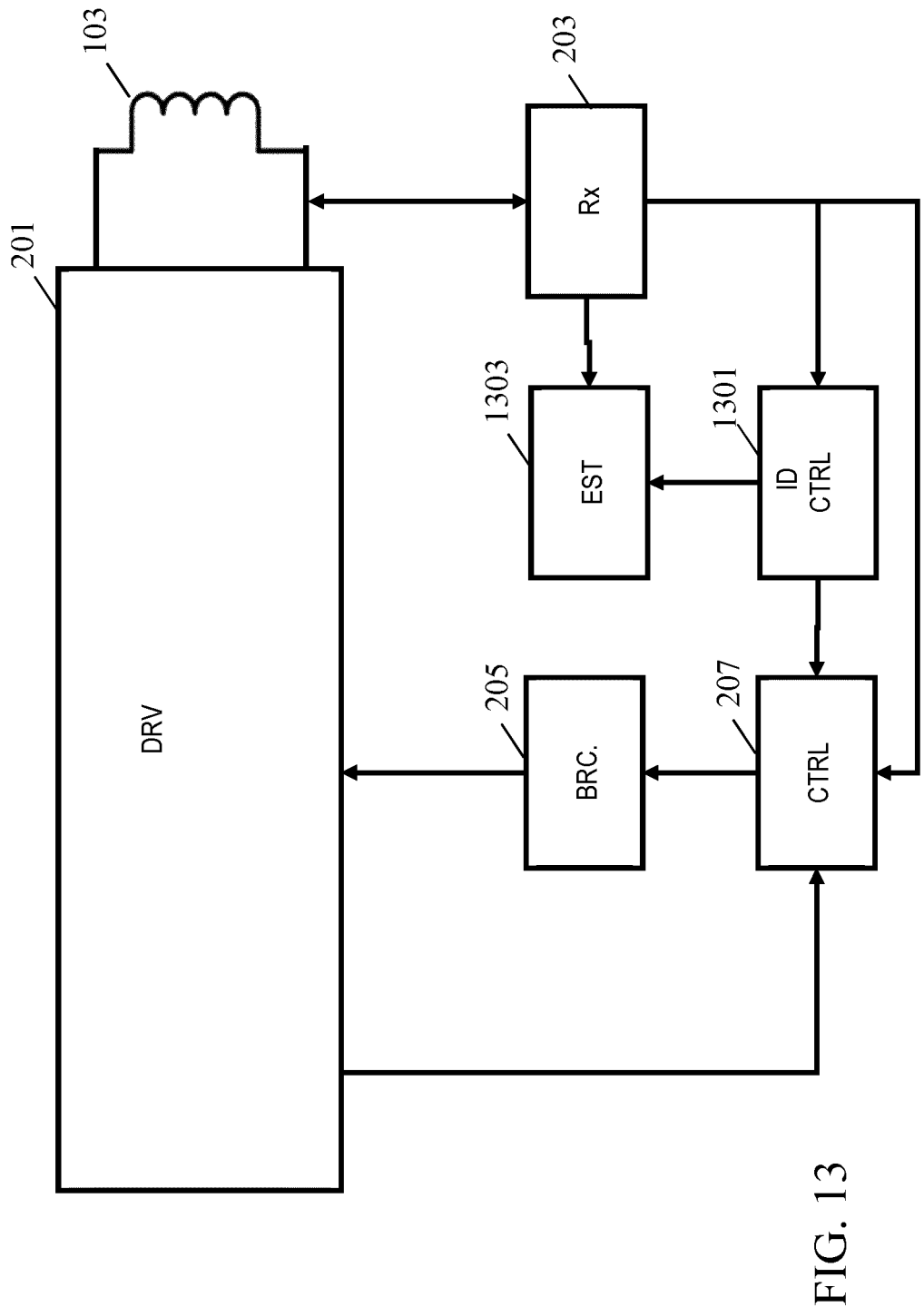
FIG. 13 illustrates an example of elements of a power transmitter in accordance with some embodiments of the invention.

FIG. 13 illustrates an example of a power transmitter 101 wherein both the temporary, power transmitter controlled identity and unused channel indication approaches are used. In the example, the power transmitter 101 of FIG. 2 further comprises an identity controller 1301 which is arrange to allocate a temporary identity to each of the plurality of power receivers (105). The identity controller 1301 is coupled to the communication controller 207 and the receiver 203. It may specifically be arranged to allocate the temporary, power transmitter controlled identity to a power receiver 105 in response to messages and identity requests received from the power receivers 105 as will be described later. It may further communicate a temporary identity allocation to the power receivers 105, for example using the broadcast transmitter 205. Specifically, it may control the communication controller 207 to cause the appropriate message to be transmitted to inform the power receivers 105 of the allocations of a temporary identity to one of the power receivers 105.

The power transmitter 101 further comprises a power estimator 1303. The power estimator is arranged to determine a received power estimate for at least one power receiver of the plurality of power receivers 105 in response to temporary identities of received power feedback messages.

Specifically, the receiver 203 may receive power feedback messages such as specifically received power messages. Each of these may comprise a temporary identity. The messages are fed to the power estimator 1303 which proceeds to determine the source power receiver of the messages based on the temporary identity. The power estimator 1303 may estimate the received power for each power receiver 105 by continuously updating a locally generated power estimate for each power receiver 105 based on messages that are identified to originate from that power receiver 105.

Figure 14:
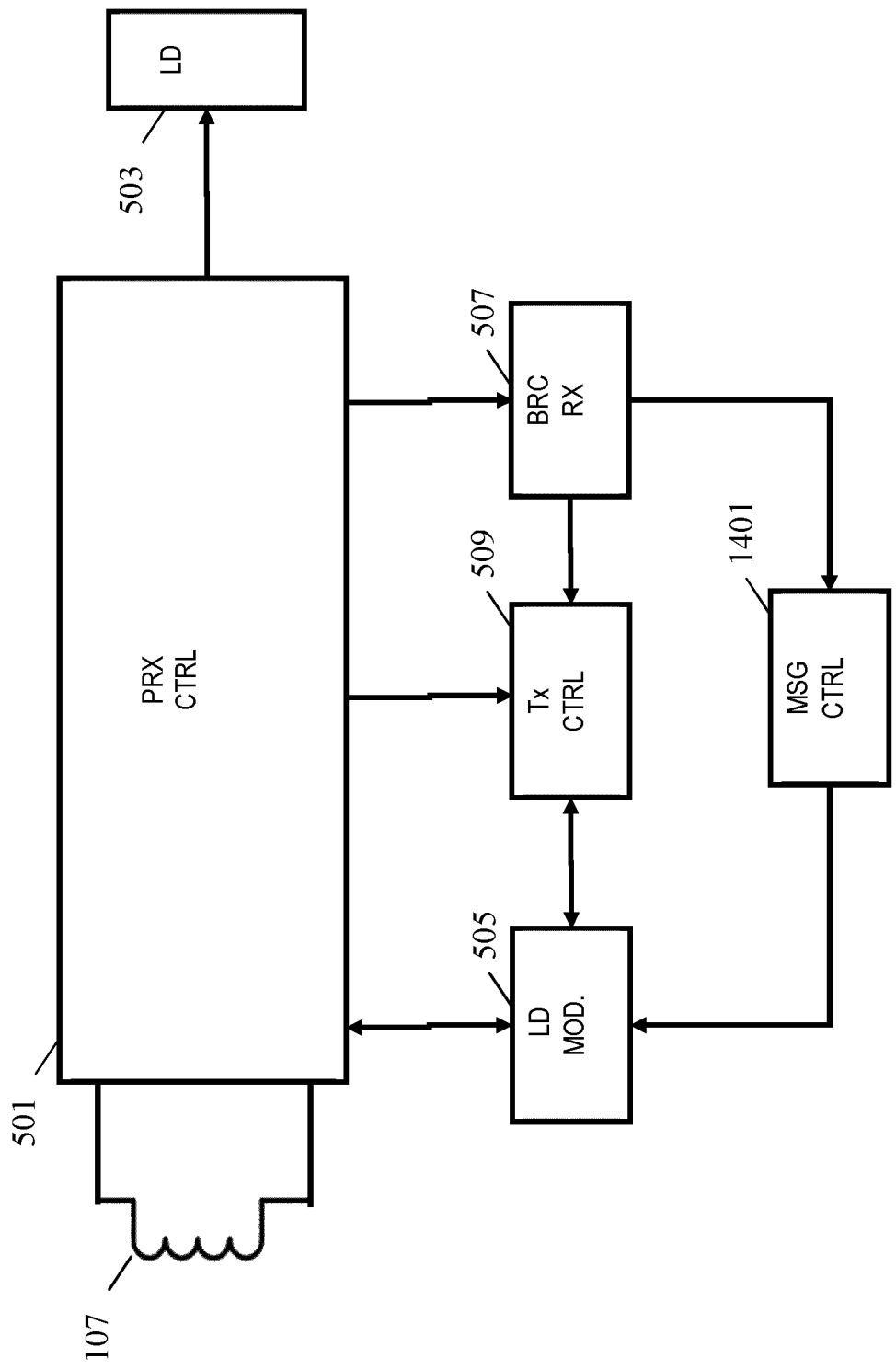
FIG. 14 illustrates an example of elements of a power receiver in accordance with some embodiments of the invention.

FIG. 14 illustrates an example of the power receiver of FIG. 5 enhanced to incorporate temporary identities. In the example, the power receiver 105 further comprises a power message controller 1401 which is arranged to include an allocated temporary identity in power feedback messages transmitted to the power transmitter 101.

Specifically, the power receiver 105 is coupled to the broadcast receiver 507 and when an allocation of a temporary identity for the specific power receiver 105 is received by the broadcast receiver 507, it forwards the temporary identity to the power message controller 1401. The power message controller 1401 is in charge of transmitting power feedback messages to the power transmitter 101 where the power feedback messages comprise an indication of a received power. The indication may e.g. be an absolute indication (e.g. of total received power), or may be a relative indication (e.g. indicating that the power received is insufficient). Specifically the power feedback messages may be received power messages. The power message controller 1401 is arranged to transmit these to the power transmitter 101 by controlling the load modulator 505. The power message controller 1401 is further in the specific example arranged to include the temporary identity in the power feedback messages sent back to the power transmitter 101.

In the system of FIGS. 13 and 14, the allocation of the temporary identity is controlled by the power transmitter 101. This may for example be achieved by the power transmitter 101 selecting a temporary identity and transmitting this to the respective power receiver 105. However, in other embodiments, the selection of the temporary identity may be performed elsewhere, such as e.g. by the power receiver 105 itself, with the power transmitter 101 being arranged to approve or reject the selected temporary identity (and thus still being in control of the allocation of the temporary identity). Thus, the temporary identity is in such scenarios assigned under the supervision of, or specifically in agreement with, the power transmitter 101.

In the following, some particularly advantageous approaches will be described.

In some applications, the power receiver 105 may be arranged to transmit an identity request message to the power transmitter 101. The power transmitter 101 may be arranged to select a temporary identity in response to the request to transmit the selected temporary identity to the power receiver 105. The power receiver 105 will then proceed to include this temporary identity in (at least some) power feedback messages. Thus, in this example the power transmitter 101 is arranged to select and distribute temporary identities and accordingly is in full control. For example, the power transmitter 101 may include a list of possible temporary identities and keep tap on which temporary identities have been allocated (and to which power receiver 105).

In other implementations, the power transmitter 101 may be arranged to approve or reject a temporary identity provided by a remote source, such as specifically it may be arranged to approve or reject a temporary identity provided by the power receiver 105. Thus, in some scenarios, the power receiver 105 may transmit a temporary identity request or proposal message to the power transmitter 101 where the message includes a proposed temporary identity. In response, the power transmitter 101 may determine whether the proposed temporary identity meets an acceptability criterion. This criterion may specifically require that the proposed temporary identity is not currently used by any other power receiver 105 served by the power transmitter 101. It may further include other requirements, such as specifically that the proposed temporary identity is one of a range of identities used (allowed to be used) by the power transmitter 101.

If the proposed temporary identity meets the acceptability criterion, the power transmitter 101 proceeds to transmit an approval message to the power receiver 105, the approval message indicating that the proposed temporary identity has been approved. The power receiver 105 then proceeds to use the proposed temporary identity by including this in power feedback messages transmitted to the power transmitter 101.

If the proposed temporary identity does not meet the acceptability criterion, the power transmitter 101 proceeds to transmit a rejection message to the power receiver 105, the rejection message indicating that the proposed temporary identity has not been approved. The power receiver 105 accordingly does not use the proposed temporary identity in power feedback messages transmitted to the power transmitter 101. Instead, the power receiver 105 may e.g. generate a new proposed temporary identity and transmit a new temporary identity request or proposal message to the power transmitter 101. This may be repeated until a proposed temporary identity is accepted by the power transmitter 101.

The approval and rejection messages may specifically correspond to respectively an acknowledge ACK or non-acknowledge NACK message. Thus, in many scenarios, the power transmitter 101 may simply respond by a one bit ACK/NACK message, or e.g. by a pattern of a plurality of bits corresponding to ACK/NACK message.

The approach may allow the identity selection, generation and incentive to reside with the power receiver 105 (e.g. in accordance with Qi principles) while at the same time allowing the power transmitter 101 to be in control of which temporary identities are allocated to each power receiver 105.

In some embodiments, the temporary identity request/proposal message may itself be a power feedback message. For example, it may be an initial power feedback message.

As an example, the power receiver 105 may transmit an initial power feedback packet, such as a received power packet, comprising a suggested temporary identifier. The packet may comprise an indication that the included identifier is suggested as a temporary identity but that it has not yet been acknowledged. The power transmitter 101 may then consider the proposed temporary identity and approve or reject by responding with an ACK or NACK message.

If an ACK response is received, the power receiver 105 is allowed to further use the suggested identifier and it accordingly proceeds to include this in future power feedback messages. If a NACK message is received, the power receiver 105 is not allowed to use the suggested identifier, and it may then proceed to transmit another initial packet containing another proposed temporary identifier.

The power transmitter 101 may in such systems also directly use the power feedback information (as well as other information) included in the initial packet. Typically, this may be subject to the power transmitter 101 deciding that the temporary identity can be used, and thus is dependent on an ACK message being transmitted.

Different approaches to releasing a temporary identity may be used. For example, in some applications, the allocation of a temporary identity may be for a limited (e.g. predetermined) time interval, and a new temporary identity must be allocated by the end of the time interval.

In other implementations, a temporary identity may remain allocated to a power receiver 105 as long as this is actively used. For example, if no message has been communicated from the power receiver 105 to the power transmitter 101 within a given time duration, the temporary identity may be considered to be released. For example, if the power transmitter 101 does not receive a power feedback message from the power receiver 105 within a duration, it may proceed to release the temporary identity, and thus the temporary identity will no longer be allocated to the power receiver 105 but may be allocated to other power receivers 105.

The power transmitter 101 may keep track of which temporary identifiers are currently in use and which are not. If an identifier is not used for a period of time, e.g. 60 seconds, the power transmitter 101 may assume that the power receiver 105 will no longer use it, and it may therefore release it for use by other power receivers 105.

In some embodiments, the temporary identity may be released by the power receiver 105 transmitting an identity release message to the power transmitter 101. Thus, it may be required that a power receiver 105 releases the temporary identifier when it no longer needs it, e.g. when it has charged its battery, or when it no longer receives power from the power transmitter 101.

FIG. 15 illustrates an example of a received power message which may be used in the described system.

In the example, two bytes ($B_1$ and $B_2$) are used for reporting the received power.

4 bits of a third byte $B_0$ (b7 ... b4 of $B_0$) are used as a temporary identity. 1 bit of the third byte (b2 of $B_0$) is used to indicate whether this is an initial message that uses this temporary identity for the first time, i.e. whether the received power message is also a temporary identity request/proposal message. The remaining bits of the third byte (x of $B_0$) may be reserved for other purposes.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc. do not preclude a plurality. Reference signs in the claims are provided merely as a clarifying example shall not be construed as limiting the scope of the claims in any way.

The invention claimed is:

1. A wireless power transfer system comprising:
    a power transmitter
        configured to:
            provide a power transfer to a plurality of power receivers via a wireless inductive power signal generated by at least one transmit inductor of the power transmitter;
    the power transmitter comprising:
        a receiver configured to:
            receive data messages, the data messages being load modulated on the wireless inductive power signal by at least one of the plurality of power receivers;
        a broadcast transmitter configured to:
            broadcast on a broadcast communication channel,
    wherein
    each of the plurality of power receivers comprising:
        a transmitter for transmitting data messages to the power transmitter by load modulation of the wireless inductive power signal;
    wherein
        the power transmitter comprises a communication controller configured to:
            determine presence of load modulation of the wireless inductive power signal; and
            broadcast first indications on the broadcast communication channel, said first indications being indicative of the wireless inductive power signal being available in a time interval for communication of a data message from a power receiver when load modulation of the wireless inductive power signal is determined not present;
    at least a first power receiver of the plurality of power receivers comprises:
        a broadcast receiver for receiving said first indications from the power transmitter on the broadcast communication channel;
        a transmission controller arranged to align transmissions of data messages with received first indications by controlling a timing of transmissions of data messages to correspond to time intervals indicated by the first indications.

2. The wireless power transfer system of claim 1 wherein the power transmitter further comprises:
    an identity controller configured to:
        allocate a temporary identity to each of the plurality of power receivers, the temporary identity being different for different power receivers of the plurality of power receivers;
    wherein each of the power receivers comprises:
        a power message controller configured to include an allocated temporary identity in power feedback messages transmitted to the power transmitter; and
    the power transmitter comprises:
        a power estimator configured to:
            determine a received power estimate for at least one power receiver of the plurality of power receivers using said temporary identities of received power feedback messages.

3. A power transmitter for a wireless power transfer system including a plurality of power receivers configured to:
    receive power from the power transmitter via a wireless inductive power signal generated by at least one transmit inductor of the power transmitter;
    the power transmitter comprising:
        a receiver configured to:
            receive data messages load modulated on the wireless inductive power signal by at least one of the plurality of power receivers;
        a broadcast transmitter configured to:

broadcast on a broadcast communication channel; and a communication controller configured to:
determine presence of load modulation of the wireless inductive power signal; and
broadcast first indications on the broadcast communication channel, said first indications being indicative of the wireless inductive power signal being available in a time interval for communication of a data message from a power receiver of the plurality of power receivers when said presence of said load modulation is not determined.

4. The power transmitter of claim 3 wherein the power transmitter is configured to:
operate in different modes of operation in different time slots of a time frame, wherein the power transmitter, when in a first mode of operation in a first time slot of the time frame, being arranged to transmit at least one first indication if no load modulation of the wireless inductive power signal is detected, and when in the second mode of operation in a second time slot of the time frame, being arranged to not transmit any first indications.

5. The power transmitter of claim 4 wherein the power transmitter is configured to:
synchronize the time frame to a timing of transmissions of data messages received from a power receiver.

6. The power transmitter of claim 4 wherein the power transmitter is configured to:
synchronize the time frame to a timing of transmissions of power control loop messages received from a power receiver.

7. The power transmitter of claim 4 wherein the communication controller is configured to:
avoid said first indications being transmitted within a predetermined time interval of an end of the first time slot.

8. The power transmitter of claim 4 wherein the power transmitter is configured to:
not operate in the second mode of operation in response to receiving power receiver configuration data indicating that all power receivers receiving power from the power transmitter are arranged to control the timing of transmissions of data messages to correspond to time intervals indicated by first indications.

9. The power transmitter of claim 3 wherein the communication controller is configured to:
broadcast said first indications by modulating a predetermined data symbol pattern on the wireless inductive power signal.

10. The power transmitter of claim 3 wherein the predetermined data symbol pattern is an alternating pattern of binary data symbols.

11. A power receiver for a wireless power transfer system including a power transmitter arranged to provide a power transfer to a plurality of power receivers via a wireless inductive power signal generated by at least one transmit inductor of the power transmitter;
the power receiver comprising:
a transmitter configured to:
transmit data messages to the power transmitter by load modulation of the wireless inductive power signal;
a broadcast receiver configured to:
receive first indications from the power transmitter on a broadcast communication channel, a first indication being indicative of the wireless inductive power signal being available for load modulation in a time interval; and
a transmission controller configured to:
align, when said power receiver includes alignment capability, transmissions of data messages with received first indications by controlling a timing of transmissions of data messages to correspond to time intervals indicated by said first indications.

12. The power receiver of claim 11 wherein the transmission controller is arranged to control initiation of transmissions of data messages to within a time interval of receiving a first indication.

13. The power receiver of claim 11 wherein the transmission controller is arranged to initiate transmission at least one type of data messages only when a first indication is being received.

14. A method of operation for a wireless power transfer system including a power transmitter arranged to provide a power transfer to a plurality of power receivers via a wireless inductive power signal generated by at least one transmit inductor of the power transmitter;
the method comprising:
the power transmitter receiving data messages, the data messages being load modulated on the wireless inductive power signal by at least one of the plurality of power receivers;
the power transmitter broadcasting on a broadcast communication channel;
each of the plurality of power receivers transmitting data messages to the power transmitter by load modulation of the wireless inductive power signal;
the power transmitter broadcasting first indications on the broadcast communication channel, said first indications being indicative of the wireless inductive power signal being available in a time interval for communication of a data message from a power receiver of the plurality of power receivers by load modulation of the wireless inductive power signal, when load modulation on the wireless inductive power signal is not present;
at least a first power receiver of the plurality of power receivers receiving first indications from the power transmitter on the broadcast communication channel; and
the first power receiver aligning transmissions of data messages with received first indications by controlling a timing of transmissions of data messages to correspond to time intervals indicated by first indications.

15. A method of operation for a power transmitter for a wireless power transfer system including a plurality of power receivers arranged to receive power from the power transmitter via a wireless inductive power signal generated by at least one transmit inductor of the power transmitter;
the method comprising:
receiving data messages load modulated on the wireless inductive power signal by at least one of the plurality of power receivers; and
broadcasting first indications on a broadcast communication channel, when load modulation on the wireless inductive power signal is not present, wherein said first indications being indicative of the wireless inductive power signal being available in a time interval for communication of a data message from a power receiver of the plurality of power receivers by load modulation of the wireless inductive power signal.

16. A method of operation for a power receiver for a wireless power transfer system including a power transmitter arranged to provide a power transfer to a plurality of power receivers via a wireless inductive power signal generated by at least one transmit inductor of the power transmitter;

the method comprising:
    transmitting data messages to the power transmitter by load modulation of the wireless inductive power signal;
    receiving first indications from the power transmitter on a broadcast communication channel, a first indication being indicative of the wireless inductive power signal being available for load modulation in a time interval; and
    aligning, when said power receiver includes alignment capability, transmissions of said data messages with said received first indications by controlling a timing of transmissions of said data messages to correspond to time intervals indicated by said first indications.

* * * * *